United States Patent
Artan et al.

(10) Patent No.: US 7,868,792 B2
(45) Date of Patent: Jan. 11, 2011

(54) GENERATING A BOUNDARY HASH-BASED HIERARCHICAL DATA STRUCTURE ASSOCIATED WITH A PLURALITY OF KNOWN ARBITRARY-LENGTH BIT STRINGS AND USING THE GENERATED HIERARCHICAL DATA STRUCTURE FOR DETECTING WHETHER AN ARBITRARY-LENGTH BIT STRING INPUT MATCHES ONE OF A PLURALITY OF KNOWN ARBITRARY-LENGTH BIT SPRINGS

(75) Inventors: Sertac Artan, Brooklyn, NY (US); H. Jonathan Chao, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 52 days.

(21) Appl. No.: 12/366,503

(22) Filed: Feb. 5, 2009

(65) Prior Publication Data

US 2010/0194608 A1 Aug. 5, 2010

(51) Int. Cl.
*H03M 7/00* (2006.01)

(52) U.S. Cl. ......................................... 341/106; 341/51
(58) Field of Classification Search ................... 341/50, 341/51, 106, 107, 87; 375/E7.093; 710/68
See application file for complete search history.

(56) References Cited

U.S. PATENT DOCUMENTS

| | | | | |
|---|---|---|---|---|
| 5,485,526 | A | * | 1/1996 | Tobin .......................... 382/232 |
| 6,121,901 | A | * | 9/2000 | Welch et al. ................... 341/51 |
| 7,403,136 | B2 | * | 7/2008 | De La Cruz et al. .......... 341/51 |

* cited by examiner

*Primary Examiner*—Brian Young
(74) *Attorney, Agent, or Firm*—Straub & Pokotylo; John C. Pokotylo

(57) ABSTRACT

A high-speed, space-efficient, scalable and easily updateable data boundary hash-based structure is generated and used. The proposed boundary hash-based data structure provides minimal perfect hashing functionality while intrinsically supporting low-cost set-membership queries. In other words, in some embodiments, it provides at most one match candidate in a set of known arbitrary-length bit strings that is used to match the query.

23 Claims, 13 Drawing Sheets

GENERATING A BOUNDARY HASH-BASED HIERARCHICAL DATA STRUCTURE ASSOCIATED WITH A PLURALITY OF KNOWN ARBITRARY-LENGTH BIT STRINGS AND USING THE GENERATED HIERARCHICAL DATA STRUCTURE FOR DETECTING WHETHER AN ARBITRARY-LENGTH BIT STRING INPUT MATCHES ONE OF A PLURALITY OF KNOWN ARBITRARY-LENGTH BIT SPRINGS

§1. BACKGROUND OF THE INVENTION

§1.1 Field of the Invention

The present invention concerns matching an arbitrary-length bit string with one of a number of known arbitrary length bit strings. The present invention may be used for network intrusion detection and prevention. In particular, the present invention concerns a novel data structure—namely, a trie bitmap content analyzer operating with a boundary hashing method—which provides minimum perfect hashing functionality while supporting low-cost set membership queries. By using such a data structure, determining whether an arbitrary length bit string matches a particular one of a number of known bit strings can be checked at high speed.

§1.2 Background Information

Network Intrusion Detection and Prevention Systems ("NIDPSs") have a vital role in current state-of-the-art network security solutions (See, e.g., Sourcefire 3d. [Online]. Available: http://www.sourcefire.com, and Fortinet. [Online]. Available: http://www.xilinx.com.) Deep Packet Inspection ("DPI") is at the heart of these NIDPSs. DPI is the detection of malicious packets by comparing the packet payloads against excerpts from known intrusion packets, (that is, against the intrusion signatures database). DPI consumes a large portion of processing power and memory for the NIDPS. Yet, achieving high-speed DPI for a low cost is a continuing challenge as the line rates and the number of intrusions continue to increase.

One way to address this challenge is to use Minimal Perfect Hash Functions ("MPHFs") to search the signature database. (See, e.g., N. S. Artan and H. J. Chao, "TriBiCa: Trie Bitmap Content Analyzer for High-Speed Network Intrusion Detection," in 26*th Annual IEEE Conference on Computer Communications (INFOCOM)*, 2007, pp. 125-133.) An MPHF is a hash function that maps a set S of n keys into exactly n integer values (0 ... n−1) without any collisions. (See, e.g., P. E. Black, "Minimal Perfect Hashing," in *Dictionary of Algorithms and Data Structures*. U.S. National Institute of Standards and Technology, July 2006. [Online]. Available: http://www.nist.gov/dads/HTML/minimalPerfectHash.html.) MPHFs provide constant worst-case query time and minimal space. Thus, they are very suitable for DPI.

§1.2.1 Previous Approaches and Perceived Limitations of Such Approaches

For DPI in NIDPS, the data structure to store the intrusion signatures database should balance the requirements of high-speed, low-cost and easy update. DPI approaches in software NIDPSs such as Snort (See [Online]. Available: http://www.snort.org.) and Bro (See V. Paxson, "Bro: A System for Detecting Network Intruders in Real-Time," *Computer Networks*, vol. 31, pp. 2435-2463, 1999.) are very flexible and support detection of sophisticated intrusions. However, they are not scalable for high speeds since they run on general-purpose hardware, which is intrinsically slow and has limited parallelism. Hence, hardware approaches are preferred for certain applications.

DPI approaches on hardware can broadly be classified into two architectures based on their signature storage media: (1) off-chip memory (See, e.g., F. Yu, T. Lakshman, and R. Katz, "Gigabit Rate Pattern-Matching using TCAM," in *Int. Conf. on Network Protocols (ICNP)*, Berlin, Germany, October 2004 and H. Song and J. Lockwood, "Multi-pattern Signature Matching for Hardware Network Intrusion Detection Systems," in 48*th Annual IEEE Global Communications Conference, GLOBECOM* 2005, St Louis, Mo., November-December 2005.) and (2) on-chip memory and/or logic blocks (See, e.g., C. Clark and D. Schimmel, "Scalable Pattern Matching for High-Speed Networks," in *IEEE Symposium on Field-Programmable Custom Computing Machines (FCCM)*, Napa, Calif., 2004, pp. 249-257, Y. H. Cho and W. H. Mangione-Smith, "Fast Reconfiguring Deep Packet Filter for 1+Gigabit Network," in *FCCM*, 2005, pp. 215-224, Z. K. Baker and V. K. Prasanna, "High-Throughput Linked-Pattern Matching for Intrusion Detection Systems," in *Proc. of the First Annual ACM Symposium on Architectures for Networking and Communications Systems*, Princeton, N.J., 2005, pp. 193-202, J. Moscola, J. Lockwood, R. P. Loui, and M. Pachos, "Implementation of a Content-Scanning Module for an Internet Firewall," in *FCCM*, 2003, pp. 31-38, I. Sourdis, D. Pnevmatikatos, S. Wong, and S. Vassiliadis, "A Reconfigurable Perfect-Hashing Scheme for Packet Inspection," in *Proc. 15th International Conference on Field Programmable Logic and Applications (FPL 2005)*, August 2005, pp. 644-647, L. Tan and T. Sherwood, "Architectures for Bit-Split String Scanning in Intrusion Detection," *IEEE Micro*, vol. 26, no. 1, pp. 110-117, January-February 2006, G. Papadopoulos and D. N. Pnevmatikatos, "Hashing+Memory=Low Cost, Exact Pattern Matching," in *Proc. 15th International Conference on Field Programmable Logic and Applications (FPL)*, August 2005, pp. 39-44, Y. Lu, B. Prabhakar, and F. Bonomi, "Perfect Hashing for Network Applications," in *IEEE Symposium on Information Theory*, Seattle, Wash., 2006, pp. 2774-2778). Architectures using off-chip memory for signature storage are fundamentally limited by the off-chip memory throughput and additional cost of memory chips. As a result of these limitations of the off-chip storage, on-chip storage has gained attention.

Additionally, due to the high parallelism available on-chip, it is desirable to multiply the signature detection throughput by replicating the DPI data structures on a single chip to allow parallel detection. Unfortunately, available on-chip storage is limited. This limitation forces highly space-optimized data structures, and the desired parallelism further constrains storage. Finally, the data structure should be simple enough to allow rapid detection to achieve high throughput to support tomorrow's line rates and large signature databases. Hence, considering the strict storage constraint and high-speed requirements, low-cost DPI is a continuing challenge.

One reason that DPI consumes a large portion of NIDPS processing power is that the intrusion signatures can appear anywhere in a packet payload. To address this issue, in DPI, each packet payload is searched using a sliding window that slides one byte at a time. The window content is compared against the intrusion signatures to detect malicious activity. In the worst-case, this requires a comparison of the window content against all the signatures for each and every byte offset from the packet payload. Using hash functions, the number of possible matches to the window content can be reduced to a few possible signatures. The window content is then compared to these signatures to verify if there is a match.

Although ordinary hash functions have a good average case speed especially when the memory utilization is low, they cannot guarantee the number of possible matches in the worst-case due to hash collisions. This is made worse if the memory utilization is high.

A Perfect Hash Function ("PHF") is a special type of hash function that eliminates all the collisions. To optimize both speed and storage, a minimal PHF ("MPHF"), which maps a given set S of n keys into exactly m=n memory slots without any collisions, can be used. Note that "keys" or "items" are used interchangeably and are meant to have the same meaning in the following paragraphs for purposes of explanation and illustration. In addition to the memory to store the keys, a hash function needs additional storage for its own representation. The information theoretical lower bound to represent an MPHF is approximately 1.4427n bits. (See, e.g., F. C. Botelho, R. Pagh, and N. Ziviani, "Simple and space-efficient minimal perfect hash functions," in *WADS*, 2007, pp. 139-150.) In the paper Y. Lu, B. Prabhakar, and F. Bonomi, "Perfect Hashing for Network Applications," in *IEEE Symposium on Information Theory*, Seattle, Wash., 2006, pp. 2774-2778, an efficient MPHF construction is given based on Bloom Filters (See, e.g., B. Bloom, "Space/Time Trade-offs in Hash Coding with Allowable Errors," *Communications of the ACM*, vol. 13, no. 7, 1970), which requires 8.6n bits for representing the MPHF in practice. This approach, however, requires a complex addressing scheme for queries, where additional logic is required to calculate the address in the hash table.

U.S. patent application Ser. No. 11/978,216 (referred to as the "Generating a Hierarchical Data Structure Associated With a Plurality of Known Arbitrary-Length BIT Strings Used For Detecting Whether An Arbitrary-Length Bit String Input Matches One of a Plurality Of Known Arbitrary-Length Bit Strings application" and incorporated herein by reference) describes a trie-based framework called TriBiCa (Trie Bitmap Content Analyzer). (See also, N. S. Artan and H. J. Chao, "TriBiCa: Trie Bitmap Content Analyzer for High-Speed Network Intrusion Detection," in *26th Annual IEEE Conference on Computer Communications (INFOCOM)*, 2007, pp. 125-133). In this framework, the algorithm gradually decides on which key to compare the packet payload among a set of keys. For each query the algorithm provides at most one match candidate. The keys can be whole or partial signatures or some other information regarding signatures. The algorithm starts with n keys at the root node of a trie and it partitions the keys into two equal-sized groups (each group with n/2 keys). Then, each of these new groups is placed into one of the child nodes of the root node and each new group is partitioned into two equal-sized groups (each group with n/4 keys). This partitioning is repeated recursively until there are n nodes each with one key.

To query for a key, the algorithm traverses the trie until a single candidate key is pointed at a leaf node. When the single key is found, only one comparison (that is, a comparison of the queried key and the candidate key) is needed to decide whether the queried key is actually the same as the candidate key. Based on the TriBiCa framework, a low-cost high-speed DPI architecture that requires a single commodity FPGA to do inspection at 10-Gbps has been proposed. (See, e.g., N. S. Artan, R. Ghosh, Y. Guo, and H. J. Chao, "A 10-Gbps High-Speed Single-Chip Network Intrusion Detection and Prevention System," in *50th Annual IEEE Global Communications Conference, GLOBECOM* 2007, Washington, D.C., November 2007.) However, it would be useful to make the trie data structures described in the Generating a Hierarchical Data Structure Associated With a Plurality of Known Arbitrary-Length BIT Strings Used For Detecting Whether An Arbitrary-Length Bit String Input Matches One of a Plurality Of Known Arbitrary-Length Bit Strings application more space efficient.

Providing a low-cost and space-efficient MPHF that is simple to construct and suitable for high-speed hardware implementation is desired.

§2. SUMMARY OF THE INVENTION

Embodiments consistent with the present invention provide a new space-efficient node structure for the TriBiCa framework called boundary. In N. S. Artan and H. J. Chao, "TriBiCa: Trie Bitmap Content Analyzer for High-Speed Network Intrusion Detection," in *26th Annual IEEE Conference on Computer Communications (INFOCOM)*, 2007, pp. 125-133 and N. S. Artan, R. Ghosh, Y. Guo, and H. J. Chao, "A 10-Gbps High-Speed Single-Chip Network Intrusion Detection and Prevention System," in *50th Annual IEEE Global Communications Conference, GLOBECOM* 2007, Washington, D.C., November 2007, bitmaps are used as node structures to efficiently represent each group for queries. The proposed boundary hash (BH) replaces the bitmaps in the nodes with the boundary data structure. BH is simple to construct and can be represented with 7n bits in practice. It can complete queries in $\log_2(n)$ pipelineable stages.

Embodiments consistent with the present invention provide a high-speed, scalable and easily updateable data structure which address the foregoing challenges. Specifically, the data structure is relatively small and its size may scale with the number of strings and the average string size in the set. In addition, the updates can be achieved without hardware modifications. Following the data structure, at least some embodiments consistent with the present invention provide a hardware architecture that tailors this data structure to the NIDPS. The exemplary hardware architecture fits into a fraction of a modest FPGA without the need for any external memory. More specifically, using parallel engines, the exemplary hardware architecture can provide speeds on the order of 10-Gbps throughput in the worst case on a Xilinx Virtex II Pro FPGA. If current state-of-the-art FPGAs are used, the proposed architecture can easily achieve DPI at speeds on the order of 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

§3. BRIEF DESCRIPTION OF THE DRAWINGS

Figure 10A:
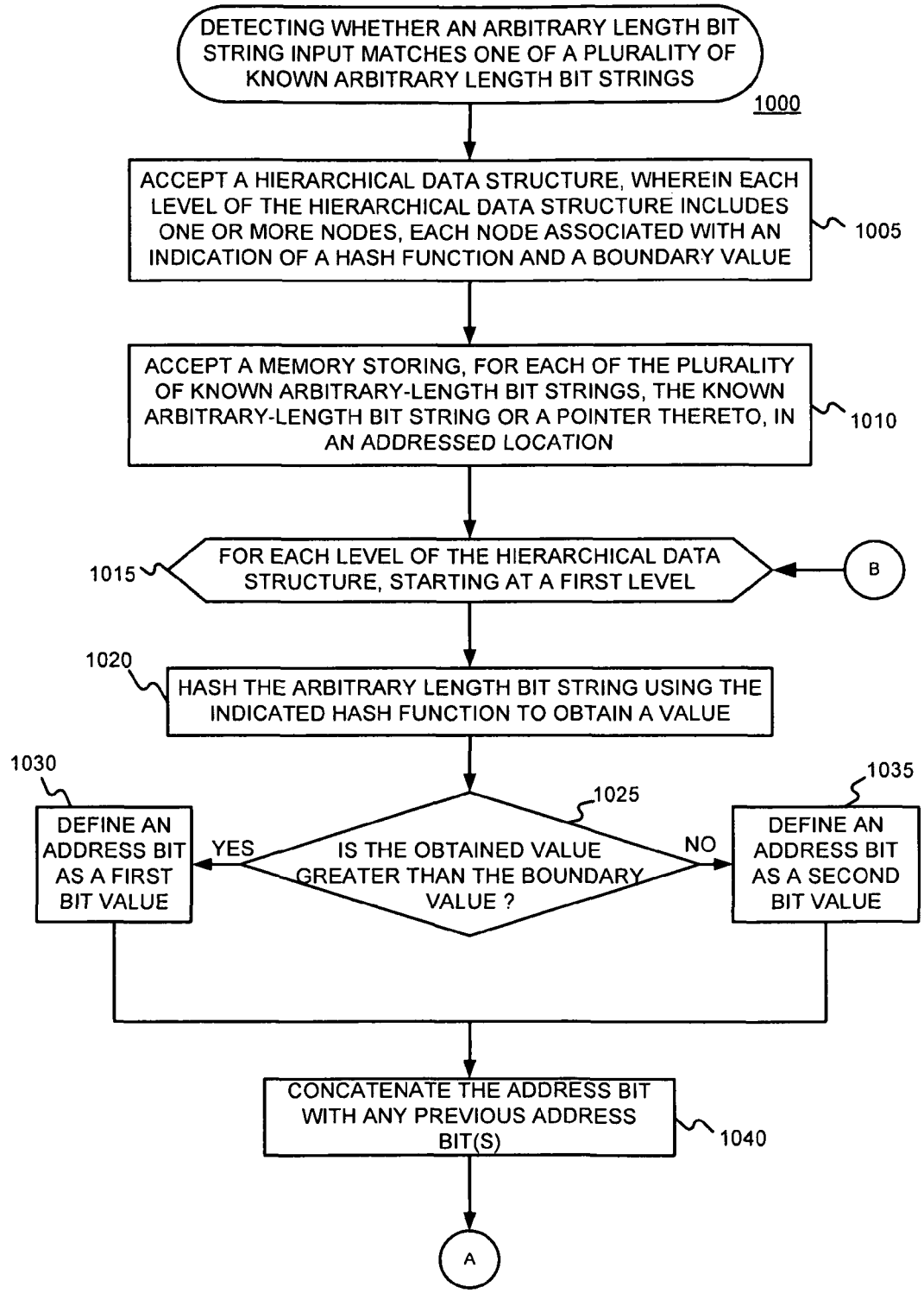
Figure 10B:
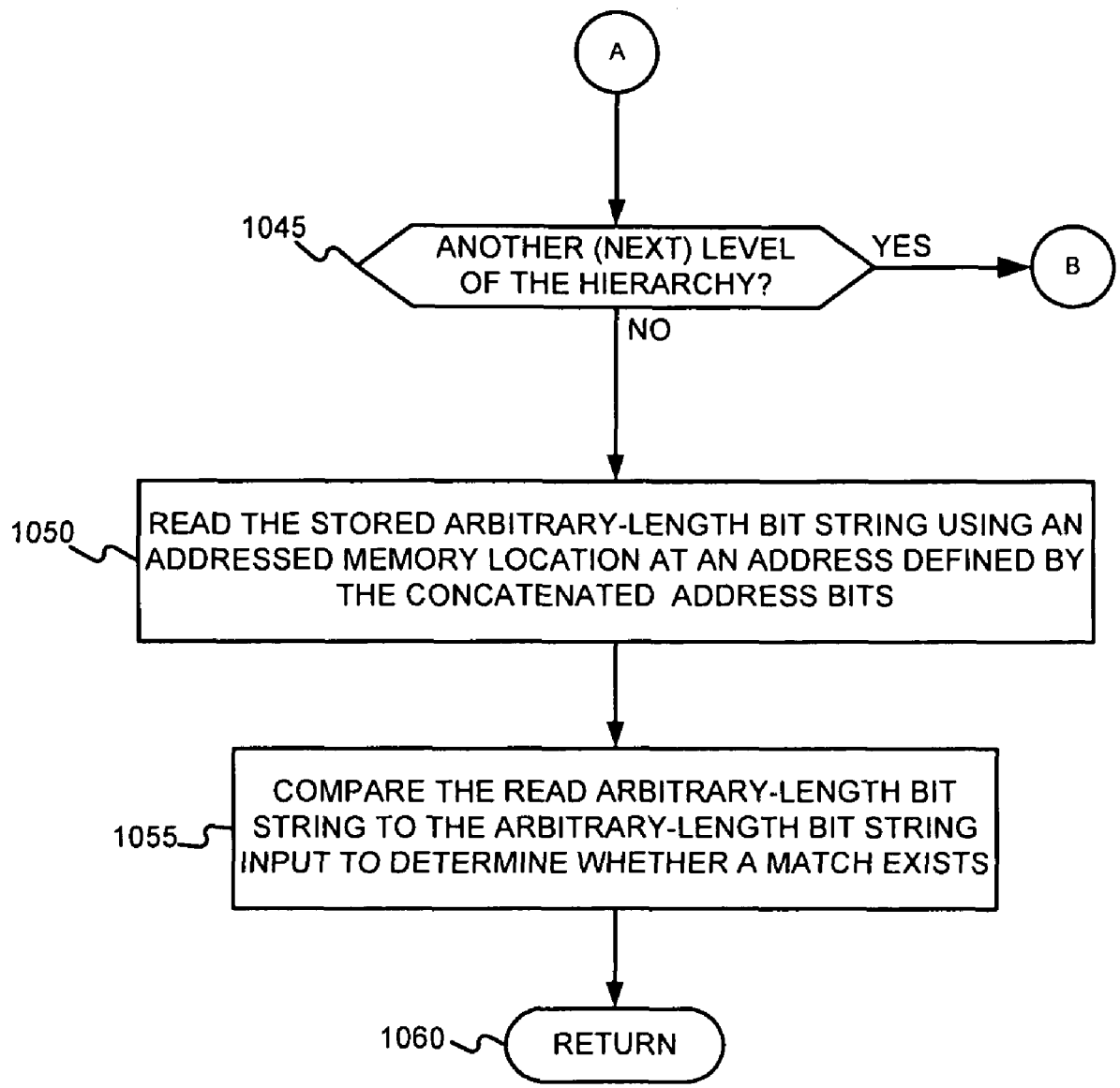

FIGS. 10A and 10B, taken collectively, are a flow diagram of an exemplary method for detecting whether an arbitrary-length bit string input matches one of a plurality of known arbitrary-length bit strings in a manner consistent with the present invention.

Figure 11:
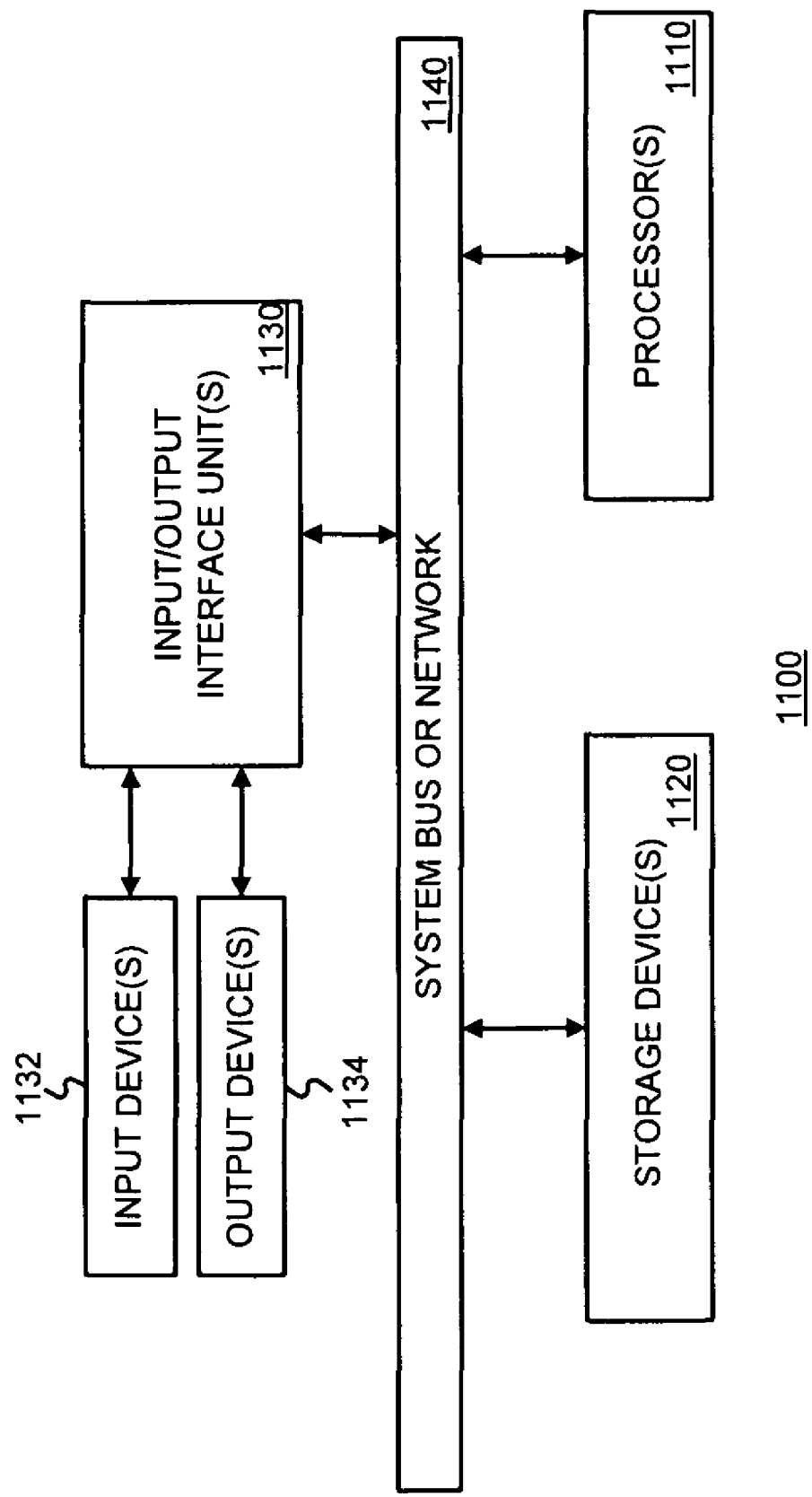

FIG. 11 is a block diagram of an exemplary apparatus that may perform various operations, and store various information generated and/or used by such operations, in a manner consistent with the present invention.

Figure 12:
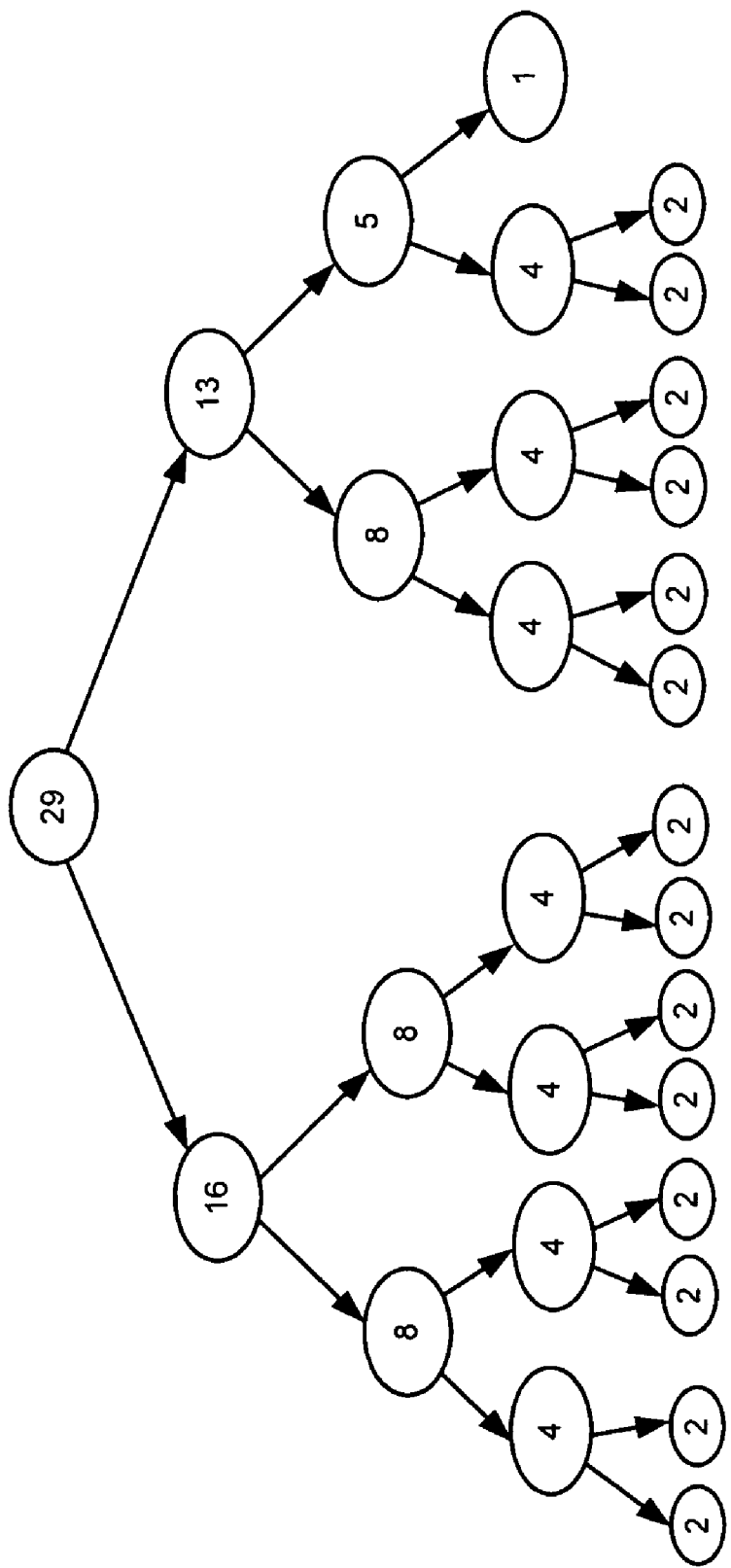

FIG. 12 illustrates an exemplary boundary hash TriBiCa binary trie structure when the number of items in its root node is not a power of two, in a manner consistent with the present invention.

§4. DETAILED DESCRIPTION

The present invention may involve novel methods, apparatus, message formats, and/or data structures to facilitate a high-speed architecture for determining whether or not an arbitrary-length bit string matches one of a number of known arbitrary-length bit strings. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Exemplary Data Structure

The data structure of an exemplary boundary hash ("BH") Trie Bitmap Content Analyser ("TriBiCa"), is now described. Suppose, a set S with n items is stored in a table with exactly n slots and each slot stores a single item from S. The objective is to design a data structure that can represent this set S and respond to a membership query on S by (1) pointing to a single possible match candidate in S (i.e., pointing to a single table slot) without any prior exact matching between the query and the items in the set, and (2) comparing the query to the item stored in the pointed table slot to determine whether a match exists. Achieving the latter objective requires finding a minimal perfect hash function for S, which maps each item of S into one of n consecutive integer values in the table without any collisions. To achieve the former objective, the data structure should rapidly determine table slot addresses for queries by providing a simple, low memory and low-cost set membership query mechanism.

The exemplary boundary hash TriBiCa data structure may achieve minimal perfect hashing by carefully partitioning the n items into equal-sized groups at each level so that at the end, all n items are uniquely partitioned (one item per group). To illustrate the above described boundary hash TriBiCa data structure, a simple example is described with reference to FIG. 1, which illustrates a binary trie with $l=\lceil \log_2(n) \rceil$ levels (where the root node is at level 0). The root node of this trie has all the n elements of S. To simplify the given example, assume n is a power of two. The n items of the root node at level 0 are arbitrarily partitioned into two equal-sized groups (n/2 each). One group is placed into the left child node and the other into the right child node. Assume that there exists such a partitioning algorithm that can arbitrarily partition n items provided in a node into two equal-sized groups (n/2 each), where one group is placed to left child node and the other group to the right child node. Further assume that a method exists that will provide a query mechanism such that the correct group of a query item can be determined. (These methods are described later.) The operation of partitioning is then repeated in a recursive manner for each child node. More specifically, each child node will inherit precisely half of the items that belong to its parent. When a leaf node is reached, there will be two items in this node. The algorithm completes its partitioning by designating one of the items in each leaf node as the left child and the other as the right child.

The path traversed from the root to each leaf node followed by the direction of an item in that node (left or right) is unique and thus defines a unique ID for each element of the set S. These IDs are used to address the table where S is stored providing a minimal perfect hash function for S.

Figure 2:
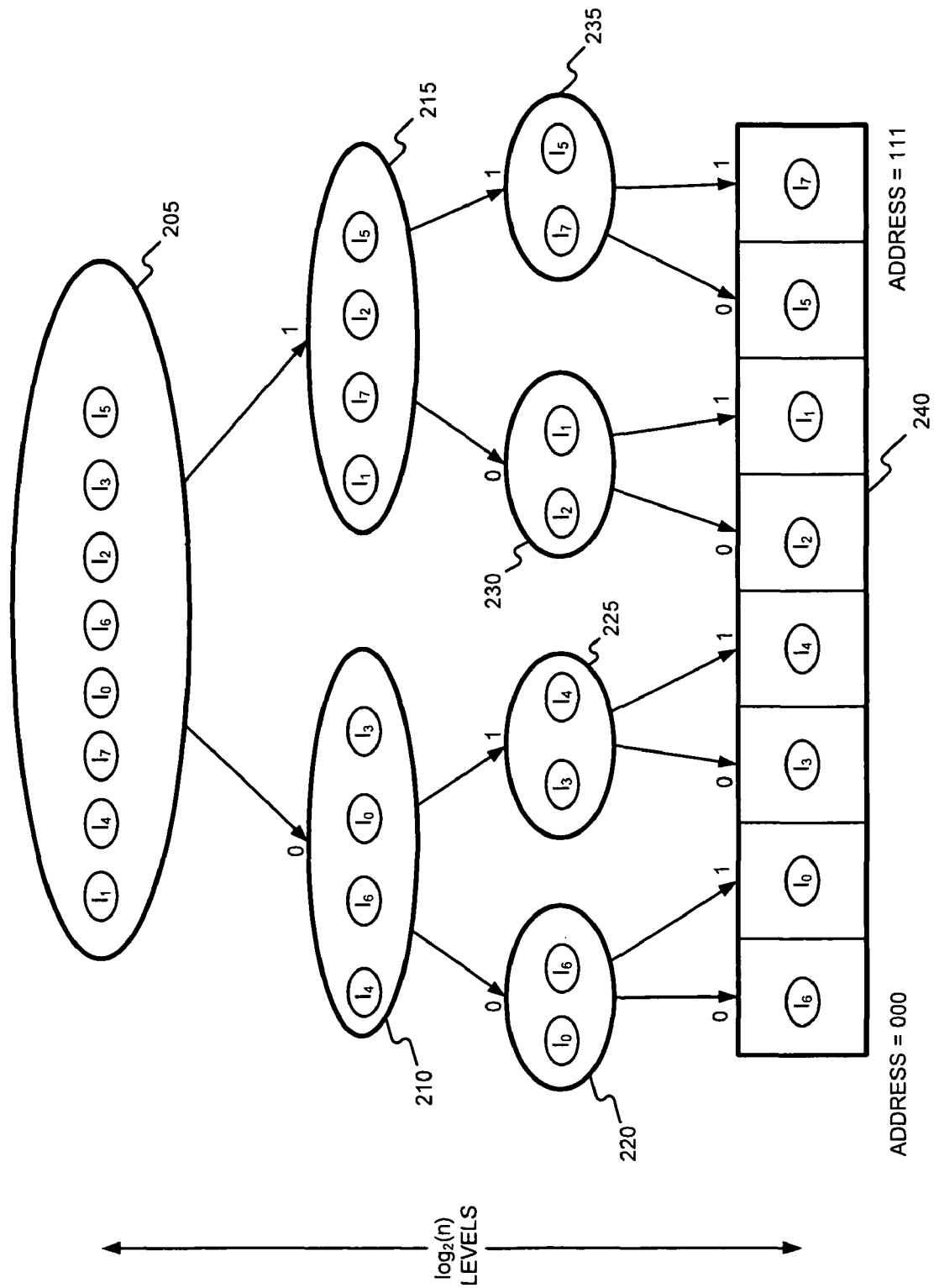
FIG. 2 illustrates a boundary hash trie data structure (having eight items in its root node), wherein each item is minimal perfect hashed in a memory location, consistent with the present invention.

FIG. 2 is another example of an exemplary binary trie structure of boundary hash TriBiCa, in which the root node 205 has eight (8) items ($I_0$-$I_7$). As illustrated in FIG. 2, at level 0 of the trie structure, these eight (8) items in the root node 205 will be partitioned by a partitioning algorithm into a left child node 210 inheriting four (4) items out of the eight (8) items in the root node 205 and a right child node 215 inheriting the remaining four (4) items in the root node. The above partitioning process is repeated at every level for every node of the trie structure until nodes containing only two items (i.e., nodes 220, 225, 230 and 235) have been partitioned, thus designating one of the two items as a left child and the other item as a right child. For example, node 220 has two items— namely $I_0$ and $I_6$—wherein item $I_6$ is designated as a left child and item $I_0$ is designated as a right child. At this point, each of the eight (8) items is stored into a memory 240 at a defined address.

The address is defined by the path traversed from the root node to each leaf node and depends on the "direction" of an item in that node. For instance, starting from the root node 205 and defining a "0" bit to represent items grouped to the left and a "1" bit to represent items grouped to the right, item $I_0$ is first grouped to the left node 210, then the left node again 220, and finally the right node. Thus the address 001 designates the location at which the item $I_0$ is to be stored in the memory 240. As illustrated in FIG. 2 item $I_0$ is stored in the memory address 001 of memory 240.

Figure 3:
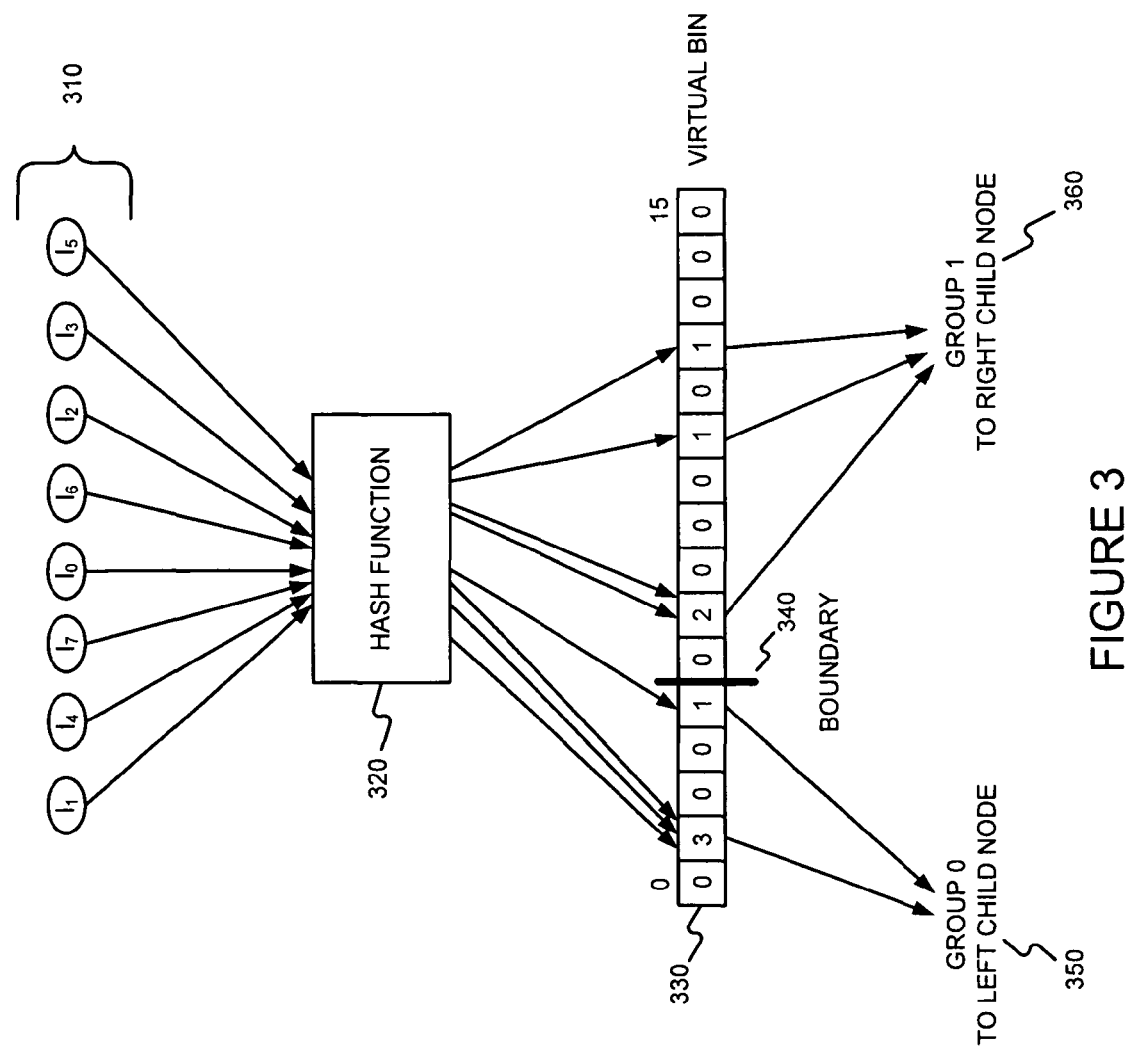
FIG. 3 illustrates components and the formation of an exemplary boundary hash TriBiCa node based on a boundary hash method consistent with the present invention.

An exemplary boundary hash TriBiCa node is illustrated in FIG. 3. The exemplary boundary hash TriBiCa node includes a hash function (e.g., a universal hash function) 320, a virtual bin 330 and a boundary 340. Note that a virtual bin need not be stored in a hierarchical data structure of a boundary hash TriBiCa trie. The virtual bin(s) 330 are used at the programming stage when "building" a boundary hash TriBiCa data structure and are not used when querying the data structure. Hence when implementing a boundary hash TriBiCa node on hardware, there is no need to store the virtual bin 330. Items are inserted into each node by hashing. As depicted in FIG. 3, eight items ($I_0$-$I_7$) 310 are hashed by the hashing function 320 and occupancy counts of the bins within the virtual bin 330 at bin locations corresponding to the hashed results are incremented. Specifically, the bin count values of each bin are initially set to zero. Then, each hash result of an item corresponds to a bin location and each bin holds a count of the total number of items hashed at its location. For instance, according to the virtual bin 330 which has 16 bin locations, three (3) of the eight (8) items 310 are hashed into bin location 1 of the virtual bin 330, one (1) item is hashed into bin location 4, two (2) items in bin location 6, and so on. Note that more than one item can be hashed into the same bin location of the virtual bin 330.

The exemplary boundary hash TriBiCa node also includes a boundary value 340 which corresponds to a bin location of the virtual bin 330 at which (1) half the hashed items 310 result in bin location addresses smaller than and up to the boundary value 340, and (2) the other half of the hashed items 310 result in bin location addresses greater than the boundary value 340. In effect, the boundary value 340 partitions the items 310 equally, into a left group and a right group.

A digit "0" bit is defined to represent items grouped to the left and a "1" bit is defined to represent items grouped to the right. For example, as illustrated in FIG. 3, the boundary value 340 is set at a value of 4 (bin location 4) according to the partitioning of the items 310 into a left child node or a right child node. Accordingly, the items hashed into bin locations 1 and 4 as shown in the virtual bin 330 with a boundary value of 4 are assigned a "0" bit and are sent to the left child node, while the items hashed into bin location 6, 10 and 12 as shown in the virtual bin 330 with a boundary value of 4 are assigned a "1" bit and are sent to the right child node. Note that each child node inherits half of the items 310 inserted/hashed into the node. The above process of inserting items into a node and partitioning takes place at every level and every node within a boundary hash TriBiCa trie structure.

§4.2 Methods for Generating Exemplary Data Structure

§4.2.1 Boundary Hash Concept in a Tribica Trie Structure

The generation of the boundary hash TriBiCa trie structure is now introduced. Note that "keys" or "items" are used interchangeably and are meant to have the same meaning in the following paragraphs for purposes of explanation and illustration. It is assumed that n is a power of two. (However the proposed method can be applied to arbitrary size n, as discussed in the Generating a Hierarchical Data Structure Associated With a Plurality of Known Arbitrary-Length BIT Strings Used For Detecting Whether An Arbitrary-Length Bit String Input Matches One of a Plurality Of Known Arbitrary-Length Bit Strings application N. S. Artan and H. J. Chao, "TriBiCa: Trie Bitmap Content Analyzer for High-Speed Network Intrusion Detection," in 26*th Annual IEEE Conference on Computer Communications (INFOCOM)*, 2007, pp. 125-133.)

To tackle the problem of constructing a minimal perfect hash function ("MPHF") for a set $S=\{K_1 \ldots K_n\}$, of n keys, a first focus on a simpler goal is introduced. This simpler goal is defined by a binary decision function, F over the queried key, q for the set S with n keys as follows:

$$F_n(q, S) = \begin{cases} 0, & q \in G_l, G_l = \{K_1 \ldots K_{n/2}\} \\ 1, & q \in G_r, G_r = \{K_{(n/2)+1} \ldots K_n\} \end{cases} \quad (1)$$

If q belongs to the left group ($G_l$), then $F_n(q, S)=0$ and if q belongs to the right group ($G_r$), then $F(q, S)=1$. So, now the query is a membership query (such as, does the queried key belong to the left or right group?) rather than a location query (such as, which memory slot stores the queried key?). Note that if $q \notin S$, the outcome of F is not specified. Also note that $G_l$ and $G_r$ are two disjoint subsets of set S. When it is determined whether the queried key belongs to group $G_l$ or $G_r$, a narrower group can be found with n/4 keys, which includes the queried key, by applying $F_{n/2}$ on the queried key. For instance, if $F_n(q, S)=0$ i.e., $q \notin G_l$, then $F_{n/2}(q,G_l)$ can be applied to find the group with n/4 keys including q. This operation can be repeated until the resulting group size is 1 (that is, until after applying $F_2$, which points out one candidate key that can match the queried key).

Assume a trie is defined, where node $N_{l,i}$ at level l stores the $i^{th}$ subset of S with size $n/2^l$ (i=1 ... $2^l$, l=0 ... $\log_2(n)-1$). Each node at level l uses one decision function $F_{n/2}^l$ and has two child nodes that store one of this nodes disjoint subsets each with $n/2^{l+1}$ keys. Let the function $H_n(q)$ be defined as the concatenation of the $\log_2(n)$ decision functions, $\{F_n, F_{n/2}, F_{n/4} \ldots F_2\}$, $$H_n(q,S)=F_n \& F_{n/2} \& F_{n/4} \ldots \& F_2 \quad (2)$$

where & shows bitwise concatenation. Let $H_n[i]$ show the $i^{th}$ bit of $H_n$, where i=0 is the most significant bit of $H_n$. Then, the function $H_n(q, S)$ defines an MPHF on the set S of n keys. Further, constructing an MPHF on a set S of n keys is equivalent to constructing the decision functions $\{F_n, F_{n/2} \ldots F_2\}$ recursively for the set S.

In the following, realizing an MPHF for a set S of n keys using perfect hash functions ("PHFs") is described. From the above it is sufficient to show that the decision function F can be constructed from the PHFs, to show how to realize an MPHF. A first look at the operation of a PHF is examined closely with an example. Then, the boundary concept will be introduced for space-efficient realization of F.

Figure 4:
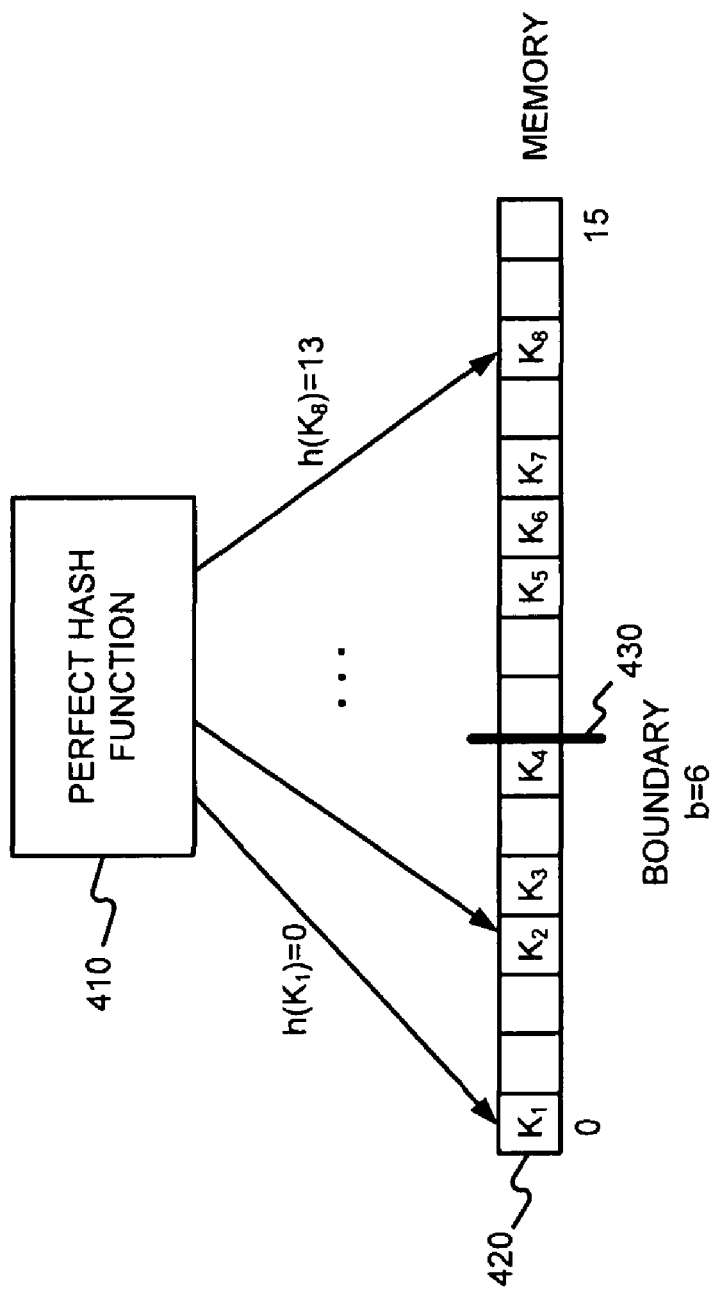
FIG. 4 illustrates an exemplary boundary hash TriBiCa node comprising and operating with a perfect hash function based on the boundary hash method consistent with the present invention.

Assume a PHF h, with a range of 0 ... m−1, is used for storing and querying n keys without collisions in a memory with m slots (m>n by PHF definition). The operation is as follows. The PHF h is first calculated for each of the n keys. Each key is inserted into the memory slot corresponding to its hash value. After all keys are stored, an index is assigned to each key in the memory incrementally, from left to right, such that the first key is $K_1$ and the last key is $K_n$. FIG. 4 shows the insertion of n=8 keys ($K_1 \ldots K_8$) into a memory 420 of m=16 slots using the PHF h 410. To make a query, h is calculated over the queried key and the corresponding memory slot is read.

To construct F from a PHF, it is necessary to be able to distinguish between the keys in the left group ($K_1 \ldots K_4$ in the example) and the right group ($K_5 \ldots K_8$). To do so, after the keys are stored, a memory slot index is additionally identified. This is called a "boundary" (b), and is defined as the index of the memory slot that stores the key, $K_{n/2}$. This slot is called the boundary slot or the boundary bin ($B_b$). For instance, in FIG. 4, the boundary 360 is at b=6.

Then, the following function $F_b$ is equivalent to the function F for a PHF, h.

$$F_b(q, S) = \begin{cases} 0, & h(q) \le b \\ 1, & h(q) > b \end{cases} \quad (3)$$

The function $F_b$ is equivalent to F since by definition, the keys are numbered from left to right in the memory 420 and there are precisely n/2 keys in the bins (0 ... b) in total as well as in the bins (b+1 ... m−1). Thus, the boundary partitions the keys into two equal-sized groups and a group to which queried key q belongs can be decided by applying $F_b$ on q just like the function F.

For a given query, the hash function is calculated. If the $h(q) \le b$, then $F_b=0$ (left group, $G_l$); otherwise, $F_b=1$ (right group, $G_r$). Since h is a PHF, there is no collision and each key has its own bin. Thus, the boundary always provides a clear distinction between $G_l$ and $G_r$. Note that once the boundary is identified, to calculate $F=F_b$, the triple (m, h, b) is sufficient and the bins are not required anymore for the query operation. To emphasize this point, bins are defined as "virtual bins".

In the foregoing, it was shown that by using PHFs, an MPHF can be realized. However, finding n−1 PHFs (one PHF per node of the trie) may be costly. In the following, other types of hash functions, not necessarily perfect, are examined.

Figure 5A:
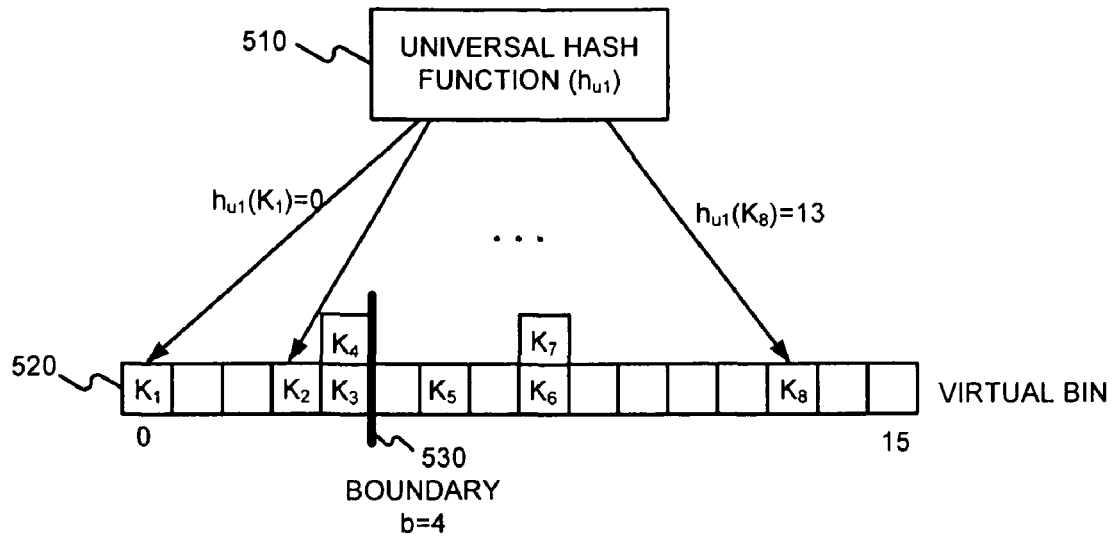
FIG. 5A illustrates an exemplary boundary hash TriBiCa node comprising and operating with a universal hash function that allows for a boundary to be determined based on the boundary hash method consistent with the present invention.
Figure 5B:
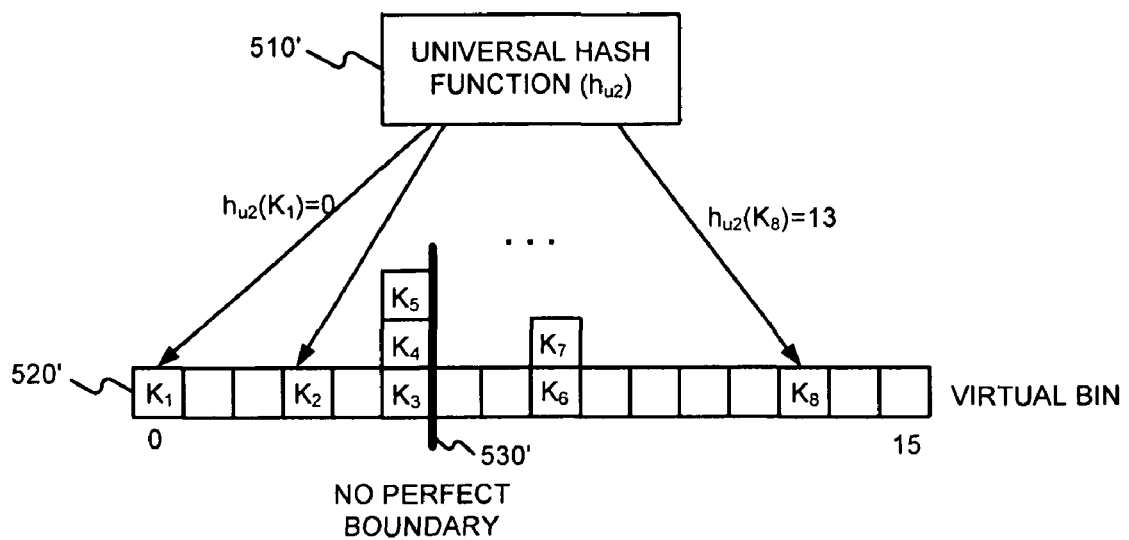
FIG. 5B illustrates an exemplary boundary hash TriBiCa node comprising and operating with a universal hash function that does not allow for a boundary to be determined based on the boundary hash method consistent with the present invention.

Assume the PHF h described above is replaced with any non-perfect hash function $h_u$ with a range of 0 ... m−1. For instance, let us assume $h_u$ is selected from a universal hash function family, such as $H_3$ (See, e.g., M. Ramakrishna, E. Fu, and E. Bahcekapili, "A Performance Study of Hashing Functions for Hardware Applications," in *Proc. of 6th International Conference on Computing and Information*, 1994, pp. 1621-1636). Since $h_u$ is not perfect, hashing n keys with $h_u$ may result in collisions. However, even when $h_u$ is used, F with $F_b$ may be realized. In fact, the only condition to realize F with $F_b$ is that the key $K_{n/2+1}$ is not stored in the boundary bin. In other words, if the keys $K_{n/2}$ and $K_{n/2+1}$ are not in collision, $F_b$ is equivalent to F and the triple (m, $h_u$, b) can be used to calculate $F=F_b$. For instance, in FIG. 5A, F can be realized with $F_b$ and can be calculated using the triple (m=16, $h_{u1}$, b=4). On the other hand in FIG. 5B, the keys $K_{n/2}=K_4$ and $K_{n/2+1}=K_5$ are in collision and the triple cannot determine whether the keys in the boundary bin ($K_3,K_4,K_5$) belong to $G_l$ or $G_r$ (thus $F \ne F_b$).

More formally, let $|B_i|$ show the number of keys in bin $B_i$. Then, F with $F_b$ can be realized if the boundary bin, $B_b$ satisfies, $$\sum_{j=0}^{b-1} |B_j| = n/2 - \varepsilon$$

and $|B_b|=\varepsilon|$, where $\varepsilon>0$. For $|B_b|>\varepsilon$, it cannot be determined whether the keys in the boundary bin belong to $G_l$ or $G_r$. Note that when the hash function is a PHF, $\forall j$, $B_j \le 1$ and so $\varepsilon=1$. Thus, if a PHF is used, F with $F_b$ can always be realized.

The foregoing demonstrates how a boundary hash TriBiCa structure consistent with the present invention can be realized with non-perfect hash functions such as universal hash functions (as presented in §4.1).

Figure 6:
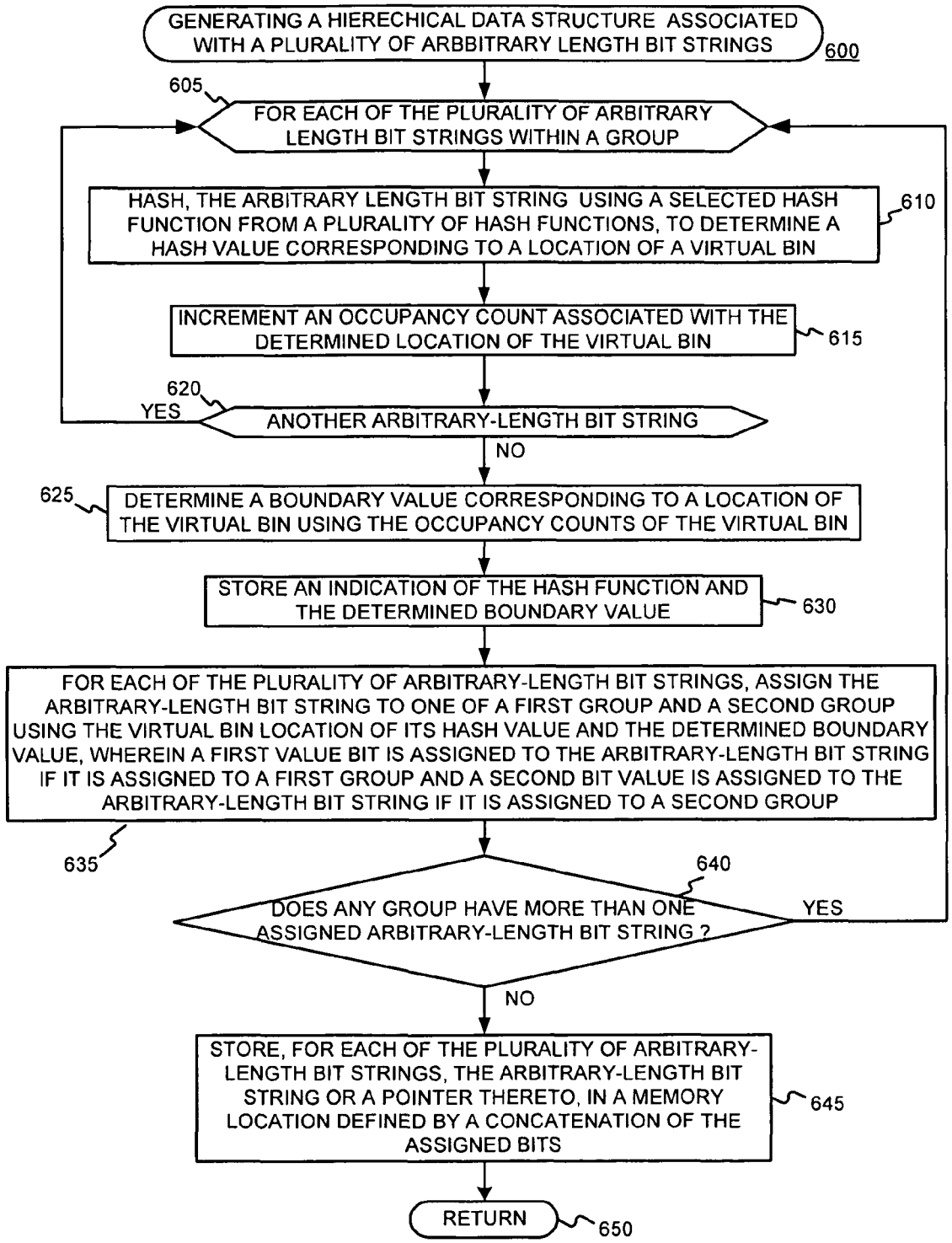
FIG. 6 is a flow diagram of an exemplary method which may be used to generate a hierarchical data structure associated with a plurality of arbitrary-length bit strings, in a manner consistent with the present invention.

§4.2.2 Exemplary Method for Generating an Exemplary Boundary Hashed-Based TRIE Data Structure FIG. 6 is a flow diagram of an exemplary method 600 which may be used to generate a hierarchical data structure associated with a plurality of arbitrary-length bit strings, in a manner consistent with the present invention. As shown, for each of the plurality of arbitrary-length bit strings within a group (Loop 605-620), the arbitrary-length bit string is hashed using a selected hash function from a plurality of hash functions to determine a hash value corresponding to a location of a virtual bin. (Block 610) Next, the method 600 may increment an occupancy count associated with the determined location of the virtual bin. (Block 615)

After blocks 610 and 615 are repeated for each of the plurality of arbitrary-length bit strings within a group, the method 600 may determine a boundary value corresponding to a location of the virtual bin using the occupancy counts of the virtual bin. (Block 625) An indication of the hash function used and the determined boundary value may then be stored. (Block 630) Thereafter, for each of the plurality of arbitrary-length bit strings, the method 600 may assign the arbitrary-length bit string to one of a first group and a second group using the virtual bin location of its hash value and the determined boundary value, wherein a first bit value is assigned to the arbitrary-length bit string if it is assigned to a first group and a second bit value is assigned to the arbitrary-length bit string if it is assigned to a second group. (Block 635)

As indicated by conditional block 640, if any of the groups has more than one assigned arbitrary-length bit string, the method 600 branches back to block 605 and steps 605-640 are repeated for those groups having more than one assigned arbitrary-length bit string. Otherwise, if any of the groups does not have more than one assigned arbitrary-length bit string, the method 600 continues to block 645. Subsequently, for each of the plurality of arbitrary-length bit strings, the arbitrary-length bit string (or a pointer to the arbitrary-length bit string) is stored in a memory location defined by a concatenation of the assigned bits. (Block 645) The method 600 is then left. (Node 650)

Referring back to block 610, in at least some embodiments consistent with the claimed invention, a hash function is selected from a universal hash function family. Each arbitrary-length bit string within a group is hashed using the selected hash function. The result of the hash corresponds to a location of a virtual bin associated with the group. Each virtual bin at each location holds an occupancy count which is incremented each time an arbitrary-length bit string is hashed at its virtual bin location.

Referring back to block 625, in at least some embodiments consistent with the claimed invention, the method 600 may determine a boundary value which corresponds to a location of a virtual bin such that the summation of occupancy counts at every location greater than the boundary value is equal to (or is within one of) half the summation of occupancy counts at every location of the virtual bin. Alternatively, the boundary value may correspond to a location of a virtual bin such that the summation of occupancy counts at every location equal to or less than the boundary value is equal to (or is within one of) half the summation of occupancy counts at every location of the virtual bin. Thus, the boundary value simply attempts to partition the number of arbitrary-length bit strings within a group into two other equal sized groups.

Referring to block 635, in at least some embodiments consistent with the claimed invention, the method 600 may assign an arbitrary-length bit string to one of a first group and a second group using the boundary value and the hash values of the arbitrary-length bit strings. A first bit is assigned to arbitrary-length bit strings each time they are assigned to a first group and a second bit is assigned to arbitrary-length bit strings each time they are assigned to a second group. A concatenation of one or more bits defines an address of the memory location storing the arbitrary-length bit string (or a pointer to the arbitrary-length bit string).

The hierarchical data structure generated by the method 600 of FIG. 6 may be a K-ary trie, where K is a whole number greater than or equal to 2. The hierarchical data structure provides a minimal perfect hash function regardless of the value of K. In at least some embodiments consistent with the present invention, K is an integer power of 2 (e.g., a binary trie). As expected, in such embodiments, the hierarchical data structure provides a minimal perfect hash function.

A data structure generated by the exemplary method 600 of FIG. 6 may be used to determine quickly whether an arbitrary-length bit string matches (or might match) one of a large number of known arbitrary-length bit strings. This characteristic makes such a data structure useful, for example, in communications network security. Specifically, this characteristic makes such a data structure useful to determine whether an input arbitrary-length bit string matches one of a number of known network intrusion signatures quickly. As another example, this characteristic also makes such a data structure useful to determine whether an input arbitrary-length bit string matches one of a number of known nucleotide sequences, such as known DNA and/or RNA sequences.

Details of exemplary embodiments for performing the method 600 of FIG. 6 in a manner consistent with the present invention are described below.

As can be appreciated from the foregoing, the method 600 of FIG. 6 may be used to produce computer-readable data structures stored on a computer-readable storage. The data structures may include an addressable memory and a hierarchical data structure. Specifically, the memory may store, for each of a plurality of known arbitrary-length bit strings, the known arbitrary-length bit string (or a pointer to the known arbitrary-length bit string) in an addressed location. Regarding the hierarchical data structure, a hash of one of the plurality of known arbitrary-length bit strings at each level of the hierarchical data structure may define whether it is assigned to a first group or a second group depending on a boundary value and ultimately whether a first bit or a second bit is assigned to it, and such that a concatenation of one or more of a first bit value and a second bit value starting at the assigned first bit value or second bit value at each level of the hierarchical data structure defines an address of the memory location storing the arbitrary-length bit string (or a pointer to the arbitrary-length bit string).

Figure 7:
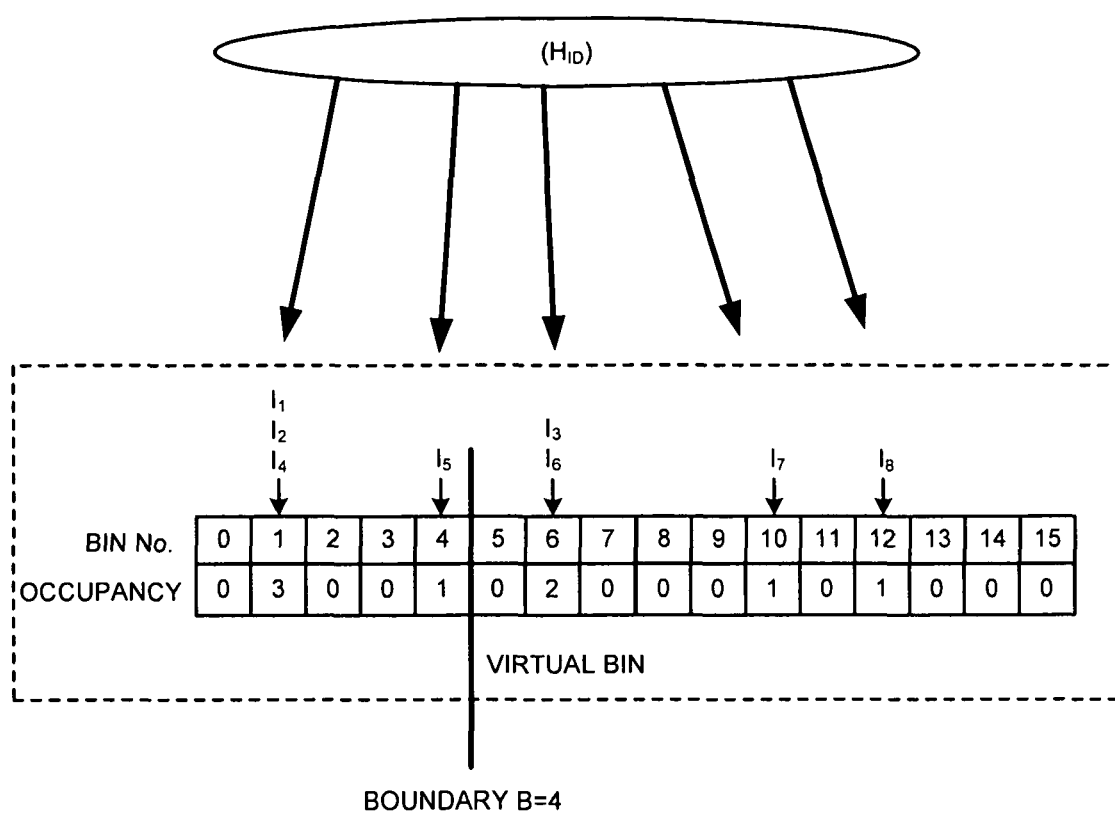
FIG. 7 illustrates another exemplary boundary hash TriBiCa node consistent with the present invention.

FIG. 7 illustrates another exemplary boundary hash TriBiCa node. As discussed earlier, each node may include an indication (which may be the hash function itself) of a hash function, a boundary value and a virtual bin. Note that a virtual bin need not be stored in a hierarchical data structure of a boundary hash TriBiCa trie. Thus, each node in a hierarchical data structure of a boundary hash TriBiCa trie only needs to store an indication (which may be the hash function itself) of a hash function used and a boundary value. The virtual bin indicates the location of a hashed item as well as the number of items (occupancy count) hashed at each location. The boundary value simply partitions the items into two equal sized groups. Items having hash values (virtual bin location) less than or equal to the boundary value are inherited by a left child node and are assigned a bit value of "0" and items having hash values greater than the boundary value are inherited by a right child node and are assigned a bit value of "1". The node illustrated in FIG. 7 has a boundary value of B=4 and partitions items $I_1, I_2, I_4$ and $I_5$ to a left child node and items $I_3, I_6, I_7$ and $I_8$ to a right node. To determine which child node an item belongs to, the item is simply hashed with a hash function, and a comparison between the hash result and the set boundary value will show which child (left=0 or right=1) node inherits this particular item.

Figure 8:
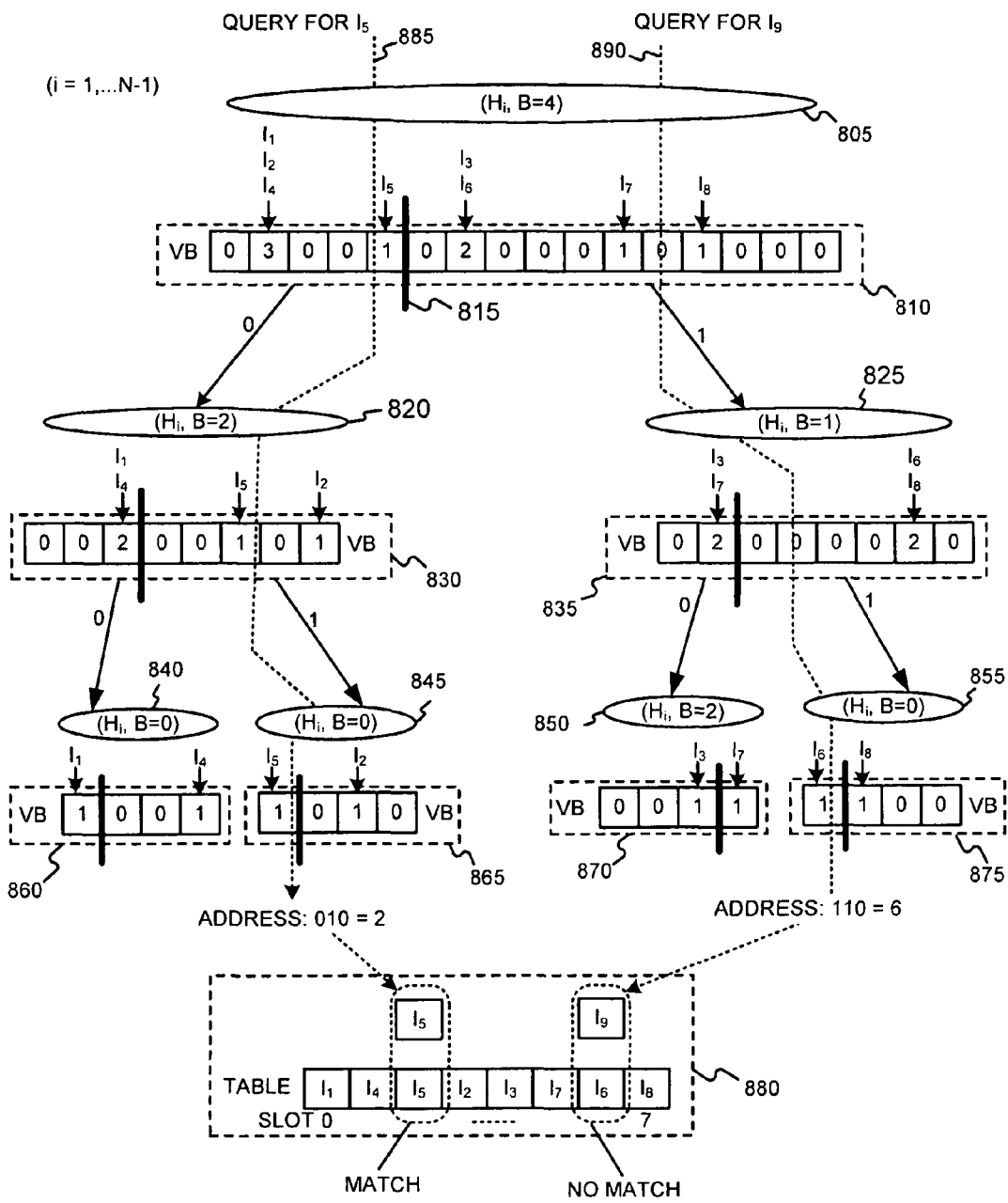
FIG. 8 is an example illustrating building and querying of an exemplary boundary hash TriBiCa trie structure, consistent with the present invention.

Given the data structure discussed earlier as well as the structure of an exemplary boundary hash TriBiCa node, examples of querying an exemplary boundary hash TriBiCa data structure are introduced. FIG. 8 illustrates an exemplary boundary hash TriBiCa trie with 3 levels and 8 items ($I_1$-$I_8$). Each node has an indication of a hash function and a boundary value stored. These items are first hashed to the root node. Half of the items in the root node ($I_1, I_2, I_4$ and $I_5$) are inherited by the left child since items $I_1, I_2, I_4$ and $I_5$ have hash values (virtual bin location) less than or equal to the boundary value 815, and the rest (items $I_3, I_6, I_7$ and $I_8$) are inherited by the right child node since items $I_3, I_6, I_7$ and $I_8$ have hash values (virtual bin location) greater than the boundary value. Items inherited by a left child node are assigned a bit value of "0" (left=0) and items inherited by a right child node are assigned a bit value of "1" (right=1). The same operation is repeated in the child nodes. For example, in virtual bin 830, $I_5$ first goes to right (at 830, $H_i(I_5)=5>B=2$) and then to the left at virtual bin 865 ($H_i(I_5)=0=B$). The path traversed is encoded by the assigned bit values (left=0, right=1) and determines the address of the item in the table. A partitioning algorithm (See, e.g., §4.2.3, below.) determines the boundary values at each node by using the virtual bin occupancies and hash locations.

When n is not an integer power of two, the binary trie will not be balanced and the partitioning might be left-aligned (that is, nodes at level 1 will be filled from left to right with $2^{\lceil log_2(n) \rceil - l}$ items as long as there are enough items left). The remainder of the items will be put into the next node and the rest of the nodes (and their children) will be removed. Optionally, boundary hash TriBiCa can be designed as an arbitrary K-ary trie instead of specifically a binary trie, where each node has K children (K may differ between levels).

Once all items from an item set S are hashed into boundary hash TriBiCa, the boundary hash TriBiCa is ready for membership queries. The input is first hashed to the root node using the indicated hash function 805. The corresponding hash value is compared with the set boundary value (B=4) of the current node 805 and the result shows the child node at which to continued (i.e., assign a bit value; left=0, right=1). Continuing in a similar manner, the trie is traversed until a leaf node is reached. The assigned bit values based on the traversed path will be used as an address to the table/memory 880 to retrieve a previously processed item. The input is compared with this item for final membership decision.

§4.2.3.1 Partitioning to Determine a Boundary Value

To achieve minimal perfect hashing, a partitioning method is required. An exemplary partitioning method consistent with the present invention is discussed in this section. For the partitioning method described here, virtual bin information such as virtual bin location/address and occupancy count at every virtual bin location is required. (Such information is illustrated in FIG. 7.) The occupancy count holds the occupancies for each bin (that is, the number of items hashed to that bin).

The exemplary partitioning method described here is straightforward. For each node to be partitioned, in its associated virtual bin, the occupancy counts at successive bin locations beginning from an end location of the virtual bin are summed until the summation is equal to half the summation of occupancy counts at every bin location of the virtual bin. Subsequently the value of the location of the virtual bin at which the summation is equal to half the summation of occupancy counts at every location of the virtual bin is set as the boundary value. If such a boundary value cannot be determined for a given node, then a new hash function for that node can be issued, and another attempt to partition the node is made.

Presented below is pseudo-code for partitioning items (keys) in a boundary hash TriBiCa node:

Given n keys, m bins, and a universal hash function $h_u$:
1: GetBoundary (S, $h_u$, A)
2: // S is a set of n keys (K1 ... Kn)
3: // $h_u$ is a universal hash function with range [0, $m_A$−1]
4: // A is an array of $m_A$ counters initialized to zero
5: for i=1 to n−1 do
6: A[$h_u(K_i)$]++
7: end for
8: sum←0, i←0, isSuccess←false
9: while sum<n/2 and i<$m_A$ do
10: sum←sum+A[i]
11: i←i+1
12: if sum=n/2 then
13: isSuccess←true
14: end if
15: end while
16: $B_1$←i−1//Boundary bin
17: return (isSuccess, $B_1$)

The method described above can be extended to a K-ary trie node by repeating the same operation for K−1 times for each partition except the last and with a target sum of n/K.

As an example, considering FIG. 7, there is a total of eight (8) items in the node that need to be partitioned in half As discussed above, the algorithm may start adding the occupancy values of bins from left to right, successively. Therefore, the partitioning method starts adding the occupancies beginning at bin 0. The addition of the successive occupancies up to bin 4 causes the total summation to reach the target value of four (4). Thus, the boundary value which corresponds to a location in the virtual bin is set at 4 as illustrated in FIG. 7. Items resulting in hash values of four (4) or less ($I_1$, $I_2$, $I_4$ and $I_5$) are assigned a bit value of "0" indicating their grouping to the left child node and the remaining items resulting in hash values of more than four (4) (i.e., $I_3$, $I_6$, $I_7$ and $I_8$) are assigned a bit value of 1 indicating their grouping to the right child node.

§4.3 Intrusion Detection Using the Exemplary Data Structures

§4.3.1 Exemplary Intrusion Detection Methods

Figure 9:
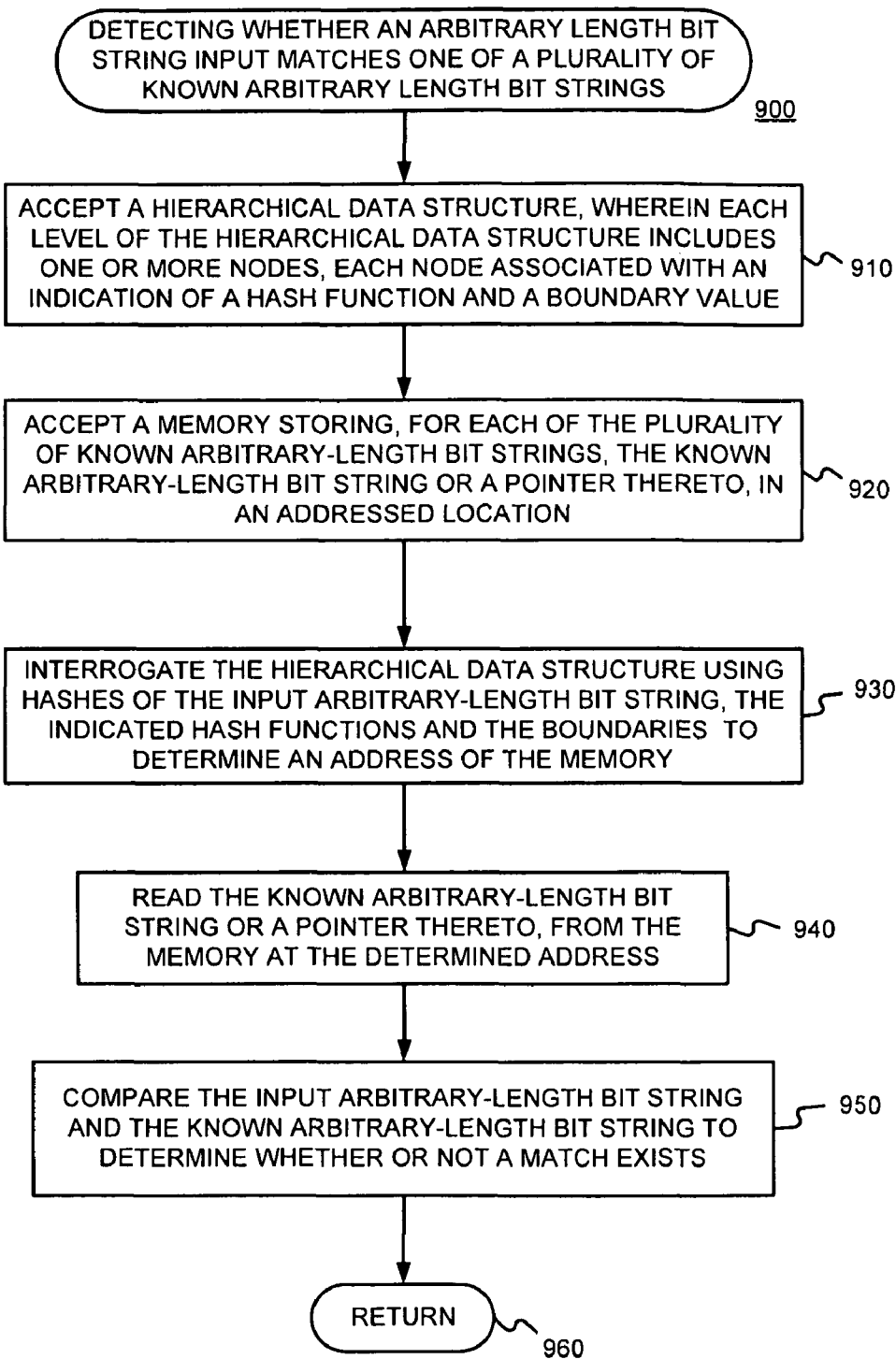
FIG. 9 is a flow diagram of an exemplary method for detecting whether an arbitrary-length bit string input matches one of a plurality of known arbitrary-length bit strings, in a manner consistent with the present invention.

FIG. 9 is a flow diagram of an exemplary method 900 for detecting whether an arbitrary-length bit string input matches one of a plurality of known arbitrary-length bit strings, in a manner consistent with the present invention. The method 900 accepts a hierarchical data structure, wherein each level of the hierarchical data structure includes one or more nodes, each node being associated with an indication of a hash function and a boundary value. (Block 910) The method 900 also accepts a memory storing, for each of the plurality of known arbitrary-length bit strings, the known arbitrary-length bit string (or a pointer to the known arbitrary-length bit string) in an addressed location. (Block 920) The exemplary method 900 interrogates the hierarchical data structure using hashes of the input arbitrary-length bit string, the indicated hash functions and the boundaries to determine an address of the memory. (Block 930) Next, the method 900 may read the known arbitrary-length bit string or a pointer thereto from the memory at the determined address. (Block 940) Finally, the method 900 may compare the input arbitrary-length bit string and the read-out known arbitrary-length bit string to determine whether or not a match exists. (Block 950) The method 900 is then left. (Node 960). Thus, the method 900 may accept an arbitrary bit string input and output a match result (e.g., no match or matches a particular bit string).

The hierarchical data structure used by the method 900 of FIG. 9 may be a K-ary trie, where K is a whole number greater than or equal to 2. The hierarchical data structure may provide a minimal perfect hash function regardless of the value of K. In at least some embodiments consistent with the present invention, K is an integer power of 2 (e.g., a binary trie). As expected, in such embodiments, the hierarchical data structure provides a minimal perfect hash function.

The method 900 of FIG. 9 may be used to determine quickly whether an arbitrary-length bit string matches (or might match) one of a large number of known arbitrary-length bit strings. This characteristic makes such a method useful, for example, in communications network security. Specifically, the method 900 may be used to determine whether an input arbitrary-length bit string matches one of a number of known network intrusion signatures. As another example, the method 900 may be used to determine whether an input arbitrary-length bit string matches one of a number of known nucleotide sequences, such as known DNA and/or RNA sequences.

Details of exemplary embodiments for performing the method 900 of FIG. 9 in a manner consistent with the present invention are described below.

Like the method 900 of FIG. 9, FIGS. 10A and 10B depict a flow diagram of an exemplary method 1000 for detecting whether an arbitrary-length bit string input matches one of a plurality of known arbitrary-length bit strings in a manner consistent with the present invention. The method 1000 accepts a hierarchical data structure, wherein each level of the hierarchical data structure includes one or more nodes, each node being associated with an indication of a hash function and a boundary value. (Block 1005) The method 1000 also accepts a memory storing, for each of the plurality of known arbitrary-length bit strings, the known arbitrary-length bit string (or a pointer to the known arbitrary-length bit string) in an addressed location. (Block 1010)

The exemplary method 1000 may interrogate all layers of the hierarchical data structure as indicated by loop 1015-1045. That is, a number of acts are performed for all layers of the hierarchical data structure, starting at a first level of the hierarchical data structure. (Block 1015) Specifically, the arbitrary-length bit string input may be hashed using the indicated hash function to obtain a value. (Block 1020) Next, referring to conditional block 1025, the method 1000 determines whether the obtained value is greater than the boundary value. (Block 1025) If it is determined that the obtained value is greater than the boundary value, then the method 1000 may define an address bit as a first bit value (e.g., "0"), and otherwise define an address bit as a second bit value (e.g., "1"). (Blocks 1025, 1030 and 1035) Subsequently, the method 1000 may concatenate the address bit with any previous address bits. (Block 1040)

It is then determined whether there is another (next) level of the hierarchical data structure (that is, whether the present level of the hierarchical data structure is not the last level). (Block 1045) If so, the method 1000 branches back to block 1015 to process the next level of the hierarchical data structure. Referring again to block 1045, if it is determined that there is not another level of the hierarchical data structure (that is, if the present level of the hierarchical data structure is the last level), then the method 1000 continues to block 1050.

At block 1050 the stored arbitrary-length bit string is read from a memory location at an address defined by the concatenation of the one or more bits. (Block 1050) Then, the read arbitrary-length bit string is compared to the arbitrary-length bit string input to determine whether a match exists (Block 1055) before the method 1000 is left (Node 1060). Thus, the method 1000 may accept an arbitrary length bit string and output a match result (e.g., no match or matches a particular bit string).

The hierarchical data structure used by the method 1000 of FIGS. 10A and 10B may be a K-ary trie, where K is a whole number greater than or equal to 2. The hierarchical data structure provides a minimal perfect hash function. In at least some embodiments consistent with the present invention, K is an integer power of 2 (e.g., a binary trie). As expected, in such embodiments, the hierarchical data structure provides a minimal perfect hash function.

Referring back to block 1040, the number of bits obtained may be a function of the trie structure. For example, in a binary trie, where each node has two (2) child nodes at a next hierarchical level, only one (1) bit need be obtained, since one (1) bit can be used to identify either of the two (2) child nodes. For a K-ary trie where K is three (3) or four (4), only two (2) bits need be obtained, since two (2) bits can be used to identify any one of three (3) or four (4) child nodes. For a K-ary trie where K is from five (5) to eight (8), only three (3) bits need be obtained, since three (3) bits can be used to identify any one of five (5) to eight (8) child nodes, and so on.

The method 1000 of FIGS. 10A and 10B may be used to determine quickly whether an arbitrary-length bit string matches (or might match) one of a large number of known arbitrary-length bit strings. This characteristic makes such a method useful, for example, in communications network security. Specifically, the method 1000 may be used to determine whether an input arbitrary-length bit string matches one of a number of known network intrusion signatures quickly. As another example, the method 1000 may be used to determine whether an input arbitrary-length bit string matches one of a number of known nucleotide sequences, such as known DNA and/or RNA sequences.

§4.3.2 Example of Detection Operations

Recall that FIG. 8 illustrates an exemplary TriBiCa trie with three (3) levels and eight (8) items ($I_1$-$I_8$). In FIG. 8, the query for the item $I_5$ depicted by a dotted line 885 passing through each level of the boundary hash TriBiCa data structure, receives a bit value in each node processed (i.e., nodes 805, 820 and 845). Specifically, following the dotted line 885, the query for item $I_5$ at node 805 is assigned a bit value of 0 since $H_i(I_5)=4=B$, at node 820 it is assigned a bit value of 1 since $H_i(I_5)=5>B=2$, and at node 845 it is assigned a bit value of 0 since $H_i(I_5)=0=B$. Hence, "010" is that concatenation of the assigned bit values through the path (i.e., nodes 805, 820 and 845) and encodes the address of a location in the table/memory 880. Specifically, the content of the table/memory 880 at address 010 (slot 2) is read. To complete the matching, the item at the address 010 (slot 2) read from the table/memory 880 is compared with the query $I_5$. The fetched item in slot 2 is $I_5$ and as expected the comparison gives a positive match since item $I_5$ is a member of the previously processed items ($I_1$-$I_8$).

The query for item $I_9$ depicted by a dotted line 890 passing through each of the levels, which is a non-member item, receives a bit value in each node processed (i.e., nodes 805, 825 and 855). Specifically, following the dotted line 890, the query for item $I_9$ at node 805 is assigned a bit value of 1 since $H_i(I_9)=11>B=4$, at node 825 it is assigned a bit value of 1 since $H_i(I_9)=3>B=1$, and at node 855 it is assigned a bit value of 0 since $H_i(I_9)=0=B$. Hence, "110" is the concatenation of the assigned bit values through the path (i.e., nodes 805, 825 and 855), 110, and encodes the address of a location in the table/memory 880. Specifically, the item at the address 110 (slot 6) is read from the table/memory 880 and compared with the query $I_9$. The read item in slot 6 is $I_6$, and as expected the comparison does not return a match since item $I_9$ is not a member.

§4.4 Exemplary Apparatus

FIG. 11 is high-level block diagram of a machine 1100 that may perform one or more of the processes described above, and/or store information used and/or generated by such processes. The machine 1100 basically includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130. The one or more processors 1110 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1120 and/or may be received from an external source via one or more input interface units 1130.

In one embodiment, the machine 1100 may be one or more conventional personal computers, servers, or routers. In this case, the processing units 1110 may be one or more microprocessors. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1110 through an appropriate interface 1130 coupled to the system bus 1140. The output devices 1134 may include a monitor or other type of display device, which may also be connected to the system bus 1140 via an appropriate interface. In addition to (or instead of) the monitor, the personal computer may include other (peripheral) output devices (not shown), such as speakers and printers for example.

Following the data structure, a hardware architecture is presented that tailors this data structure to the NIDPS. The hardware architecture fits into a fraction of a modest FPGA without the need for any external memory. More specifically, using parallel engines, the architecture can provide speeds on the order of 10-Gbps throughput in the worst case on a Xilinx Virtex II Pro FPGA. If current state-of-the-art FPGAs are used, the proposed architecture can easily achieve DPI at speeds on the order of 40 Gbps. The updates can be done through on-chip memory without any reconfiguration of the on-chip logic (that is, without any hardware modification), allowing faster response to new attacks. Avoiding external memory access not only improves speed, but also allows parallel designs to fit into the same chip.

Instead of, or in addition to, FPGAs, other hardware, such as ASICS for example, may be used to implement one or more components of various embodiments consistent with the present invention.

Thus, various aspects of embodiments consistent with the present invention may be implemented in hardware and/or software. For example, a boundary hash TriBiCa data structure may be designed using software, and then provided on a hardware detector.

§4.5 Refinements and Extensions

Figure 1:
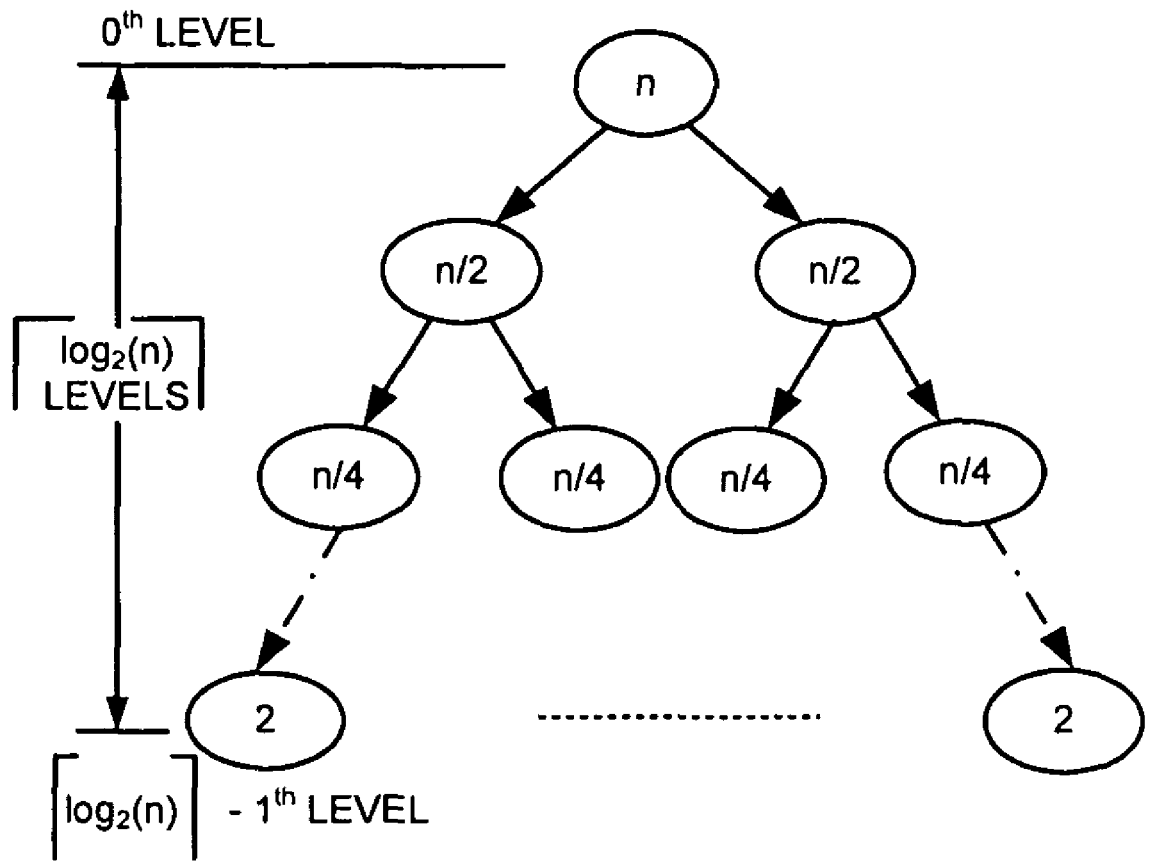
FIG. 1 illustrates a binary trie structure (with $l=\lceil \log_2(n) \rceil$ levels where the root node is at level 0,) consistent with the present invention.

Although some of the foregoing examples were discussed in terms of boundary hash TriBiCa data structures being binary trie structures wherein the number of items/keys (n) in the nodes is a power of two, as illustrated in FIGS. 1 and 2, such a case is not a requirement. For instance, FIG. 12 illustrates a case of a binary trie with an odd number of items n. When n is not an integer power of two, the binary trie will not be balanced and the partitioning might be left-aligned (that is, nodes at level l will be filled from left to right with $2^{\lceil \log_2(n) \rceil - l}$ items as long as there are enough items left). The remainder of the items will be put into the next node and the rest of the nodes (and their children) will be removed (as illustrated in FIG. 12). Optionally, boundary hash TriBiCa can be designed as a K-ary trie instead of a binary trie, where each node has K children (K may differ between levels). Note that when K is not a power of 2, an addresses determined by a path traversed along the K-ary trie may not be represented in binary but in another base (e.g., for K=3, a ternary number can represent the address; e.g., 120 represents 0×1+2×3+1×9=15)

Ultimately, the number of items (n) within any node of a boundary hash TriBiCa data structures does not have to be a power of two and could be any whole number. Also, boundary hash TriBiCa data structures do not have to be a binary trie (i.e., K is an integer power of 2) and generally could be design as a K-ary trie where K is a whole number greater than or equal to 2. Regardless of whether (n) or K are integer powers of 2 the boundary hash TriBiCa scheme discussed above can provide a data structure that is an MPHF.

Although some of the foregoing examples were discussed in terms of "items", such items may be arbitrary-length bit strings. Examples of arbitrary-length bit strings include, for example, network intrusion signatures, nucleotide sequences, etc.

Referring back to §4.2, in the boundary hash trie, there are $\log_2(n)$ levels. At the root node, there are n keys and at each level, the number of keys per node is halved compared to the previous level. The number of bins and number of keys in a node at level l may be defined as $m_l$ and $n_l$, respectively. To keep the bin per key ratio in a node constant, the same halving relation can be applied to the number of virtual bins at a node between levels. Given $m_0 = M_R$ virtual bins at root node (root node is at level 0), there will be $m_l = M_R/2^l$ virtual bins at any node at level l. There are 2l nodes at level l in total. Thus, the total number of virtual bins at any level is constant and equal to $M_R$, since, $2^l \cdot M_R/2^l = M_R$.

Fortunately, for boundary hashing, it is unnecessary to store the virtual bins. Instead a boundary (and a hash function (indicator)) is stored for each node. Since, there are $M_R/2^l$ bins in a node at level l, the memory requirement for such a node to store a single boundary is $\log_2(M_R/2^l)$ bits.

Hence, the total space required to store all the boundaries for the $2^l$ nodes at level is:

$$M_l = 2^l \cdot \log_2(M_R/2^l) \quad (4)$$

From (4), the total memory for the boundary hash trie with $\log_2(n)$ levels is, $$M = \sum_{i=0}^{\log_2(n)-1} 2^i \cdot \log_2(M_R/2^i) \quad (5)$$

Simplifying (5) results in, $$M = -\sum_{i=0}^{\log_2(n)-1} (2^i \cdot i) + \log_2(M_R) \cdot \sum_{i=0}^{\log_2(n)-1} (2^i) \quad (6)$$

Definition 1: (From geometric series)

$$\sum_{k=0}^{j} k \cdot r^{k-1} = \frac{1-r^{j+1}}{(1-r)^2} - \frac{(j+1) \cdot r^j}{1-r} \quad (7)$$

Definition 2:

$$\sum_{i=0}^{j} 2^i = 2^{j+1} - 1 \quad (8)$$

Note that the left part of M (define it as $M_{left}$) in (6) can be rewritten as $$M_{left} = \sum_{i=0}^{\log_2(n)-1} (2^i \cdot i) = 2 \cdot \sum_{i=0}^{\log_2(n)-1} (i \cdot 2^{i-1}) \quad (9)$$

which is equivalent to Definition 1, given r=2 and j=log$_2$(n)−1. Then, $M_{left}$ becomes $$M_{left}=(\log_2(n)-2) \cdot n+2 \quad (10)$$

From Definition 2, the right part of M (define it as $M_{right}$) in (6) can be rewritten as $$M_{right} = \log_2(M_R) \cdot \sum_{i=0}^{\log_2(n)-1} (2^i) \quad (11)$$

$$= \log_2(M_R) \cdot (n-1) \quad (12)$$

Substituting (10) and (12) in (6) results in:

$$M=\log_2(M_R/n) \cdot n+2 \cdot n-\log_2(M_R)-2 \quad (13)$$

If $M_R$=O(n), then log$_2$($M_R$/n)=O(1) and log$_2$($M_R$)=O(log$_2$(n)). Thus, the storage complexity for storing all the boundaries for the trie is O(n). Additionally, for each node, a hash function is used from a pool of universal hash functions. The worst-case universal hash function storage complexity is O(n·(log$_2$(⌈|H|⌉)+H$_w$)), where |H| shows the total number of universal hash functions used in the system and H$_w$ is the representation size of individual hash functions. Although, |H|=n−1 in the worst-case (one hash function per node), making worst-case hash function storage complexity O(n·(log$_2$(n)+H$_w$)).

§4.6 Conclusions

Embodiments consistent with the present invention provide and/or use a high-speed, scalable and easily updateable data structure used for determining whether or not an arbitrary length bit string matches a previously processed bit string. Specifically, the data structure is relatively small and its size may scale with the number of strings and the average string size in the set. In addition, the updates can be achieved without hardware modifications. The proposed data structure, called a boundary hashed TriBiCa (Trie Bitmap Content Analyzer), provides minimal perfect hashing functionality while intrinsically supporting low-cost set-membership queries and while using storage space efficiently. In other words, in some embodiments, it provides at most one match candidate in the signature set that is used to match the query.

Following the data structure, a hardware architecture is presented that tailors this data structure to the NIDPS.

An exemplary hardware architecture fits into a fraction of a modest FPGA without the need for any external memory. More specifically, using parallel engines, the architecture can provide speeds on the order of 10-Gbps throughput in the worst case on a Xilinx Virtex II Pro FPGA. If current state-of-the-art FPGAs are used, the proposed architecture can easily achieve DPI at speeds on the order of 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

What is claimed is:

1. A method for generating a hierarchical data structure associated with a plurality of arbitrary-length bit strings, the method comprising:
   a) for each of the plurality of arbitrary-length bit strings within a group,
      1) hashing the arbitrary-length bit string, using a selected hash function from a plurality of hash functions, to determine a hash value corresponding to a location of a virtual bin,
      2) incrementing an occupancy count associated with the determined location of the virtual bin;
   b) determining a boundary value corresponding to a location of the virtual bin using the occupancy counts of the virtual bin;
   c) storing an indication of the hash function and the determined boundary value;
   d) for each of the plurality of arbitrary-length bit strings, assigning the arbitrary-length bit string to one of a first group and a second group using the virtual bin location of its hash value and the determined boundary value, wherein a first bit is assigned to the arbitrary-length bit string if it is assigned to a first group and a second bit is assigned to the arbitrary-length bit string if it is assigned to a second group;
   e) for each of the groups, repeating acts (a) through (d) to generate two further sub-groups until each of the two further sub-groups has one or less assigned arbitrary-length bit string; and
   f) storing, for each of the plurality of arbitrary-length bit strings, the arbitrary-length bit string or a pointer thereto, in a memory location defined by a concatenation of the assigned bits.

2. The method of claim 1 wherein a boundary value corresponding to a location of a virtual bin is a value such that the summation of occupancy counts at every location greater than the boundary value is equal to half the summation of occupancy counts at every location of the virtual bin.

3. The method of claim 1 wherein a boundary value corresponding to a location of a virtual bin is a value such that the summation of occupancy counts at every location equal and less than the boundary value is equal to half the summation of occupancy counts at every location of the virtual bin.

4. The method of claim 2 wherein the boundary value corresponding to a location of the virtual bin is determined by:
   1) summing occupancy counts at successive locations beginning from an end location of the virtual bin until the summation is equal to half the summation of occupancy counts at every location of the virtual bin;
   2) setting the value of the location of the virtual bin at which the summation is equal to half the summation of occupancy counts at every location of the virtual bin as the boundary value.

5. The method of claim 1 wherein the hierarchical data structure is a K-ary trie, where K is a whole number greater than or equal to 2.

6. The method of claim 5 wherein the hierarchical data structure provides a minimal perfect hash function.

7. The method of claim 1 wherein the hierarchical data structure is a K-ary trie, where K is an integer power of 2 and wherein the hierarchical data structure provides a minimal perfect hash function.

8. The method of claim 1 wherein the hierarchical data structure is a binary trie.

9. The method of claim 8 wherein the hierarchical data structure provides a minimal perfect hash function.

10. The method of claim 1 wherein the arbitrary-length bit string is a communications network intrusion signature.

11. The method of claim 1 wherein the arbitrary-length bit string is a nucleotide sequence.

12. Apparatus for generating a hierarchical data structure associated with a plurality of arbitrary-length bit strings, the apparatus comprising:
- a) means, for each of the plurality of arbitrary-length bit strings within a group, for
  1) hashing the arbitrary-length bit string, using a selected hash function from a plurality of hash functions, to determine a hash value corresponding to a location of a virtual bin,
  2) incrementing an occupancy count associated with the determined location of the virtual bin;
- b) means for determining a boundary value corresponding to a location of the virtual bin using the occupancy counts of the virtual bin;
- c) means for storing an indication of the hash function and the determined boundary value;
- d) means, for each of the plurality of arbitrary-length bit strings, for assigning the arbitrary-length bit string to one of a first group and a second group using the virtual bin location of its hash value and the determined boundary value, wherein a first bit is assigned to the arbitrary-length bit string if it is assigned to a first group and a second bit is assigned to the arbitrary-length bit string if it is assigned to a second group;
- e) means, for each of the groups, for repeating acts (a) through (d) to generate two further sub-groups until each of the two further sub-groups has one or less assigned arbitrary-length bit string; and
- f) means for storing, for each of the plurality of arbitrary-length bit strings, the arbitrary-length bit string or a pointer thereto, in a memory location defined by a concatenation of the assigned bits.

13. A method for detecting whether an arbitrary-length bit string input matches one of a plurality of known arbitrary-length bit strings, using
- a memory storing, for each of the plurality of known arbitrary-length bit strings, the known arbitrary-length bit string or a pointer thereto, in an addressed location, and
- a hierarchical data structure, wherein each level of the hierarchical data structure includes one or more nodes, each node associated with an indication of a hash function and a boundary value, the boundary value partitioning a set of results of the hash function of at least some of the known arbitrary-length bit strings, the method comprising:
- a) interrogating the hierarchical data structure using hashes of the input arbitrary-length bit string, the indicated hash functions and the boundaries to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists.

14. The method of claim 13 wherein the acts of the method include, starting at a first level of the hierarchical data structure,
1) hashing the arbitrary length bit string using the indicated hash function to obtain a value;
2) comparing the obtained value with the boundary value;
3) if the obtained value is greater than the boundary value, defining an address bit as a first bit value, otherwise defining the address bit as a second bit value;
4) concatenating the address bit with any previous address bits,
5) determining whether the present level of the hierarchical data structure is a last level; and
6) if it was determined that the present level of the hierarchical data structure is not the last level, then
   A) repeating acts (1) through (5) at a next level of the hierarchical data structure, and otherwise, if it was determined that present level of the hierarchical data structure is the last level, then
   A) reading the stored arbitrary-length bit string using an addressed memory location at an address defined by the concatenation of the address bits, and
   B) comparing the read arbitrary-length bit string to the arbitrary-length bit string input to determine whether a match exists.

15. The method of claim 13 wherein the acts of the method include, starting at a first level of the hierarchical data structure,
1) hashing the arbitrary length bit string using the indicated hash function to obtain a value;
2) comparing the obtained value with the boundary value;
3) if the obtained value is less than or equal to the boundary value, defining an address bit as a first bit value, otherwise defining the address bit as a second bit value;
4) determining whether the present level of the hierarchical data structure is a last level; and
5) if it was determined that the present level of the hierarchical data structure is not the last level, then
   A) concatenating the address bit with any previous address bits, and
   B) repeating acts (1) through (4) at a next level of the hierarchical data structure, and
otherwise, if it was determined that present level of the hierarchical data structure is the last level, then
   A) concatenating the address bit with any previous address bits, and
   B) reading the stored arbitrary-length bit string using an addressed memory location at an address defined by the concatenation of the address bits, and
   C) comparing the read arbitrary-length bit string to the arbitrary-length bit string input to determine whether a match exists.

16. A method for detecting whether an arbitrary-length bit string input matches one of a plurality of known arbitrary-length bit strings, using
- a memory storing, for each of the plurality of known arbitrary-length bit strings, the known arbitrary-length bit string or a pointer thereto, in an addressed location, and
- a hierarchical data structure, wherein each level of the hierarchical data structure includes one or more nodes, each node associated with an indication of a hash function and a boundary value, the method comprising:
- a) interrogating the hierarchical data structure using hashes of the input arbitrary-length bit string, the indicated hash functions and the boundaries to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists, wherein the hierarchical data structure is a K-ary trie, where K is a whole number greater than or equal to 2.

17. The method of claim 16 wherein the hierarchical data structure provides a minimal perfect hash function.

18. A method for detecting whether an arbitrary-length bit string input matches one of a plurality of known arbitrary-length bit strings, using a memory storing, for each of the plurality of known arbitrary-length bit strings, the known arbitrary-length bit string or a pointer thereto, in an addressed location, and a hierarchical data structure, wherein each level of the hierarchical data structure includes one or more nodes, each node associated with an indication of a hash function and a boundary value, the method comprising:
- a) interrogating the hierarchical data structure using hashes of the input arbitrary-length bit string, the indicated hash functions and the boundaries to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists, wherein the hierarchical data structure is a K-ary trie, where K is an integer power of 2 and wherein the hierarchical data structure provides a minimal perfect hash function.

19. The method of claim 13 wherein the hierarchical data structure is a binary trie.

20. The method of claim 19 wherein the hierarchical data structure provides a minimal perfect hash function.

21. A method for detecting whether an arbitrary-length bit string input matches one of a plurality of known arbitrary-length bit strings, using a memory storing, for each of the plurality of known arbitrary-length bit strings, the known arbitrary-length bit string or a pointer thereto, in an addressed location, and a hierarchical data structure, wherein each level of the hierarchical data structure includes one or more nodes, each node associated with an indication of a hash function and a boundary value, the method comprising:
- a) interrogating the hierarchical data structure using hashes of the input arbitrary-length bit string, the indicated hash functions and the boundaries to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists, wherein the arbitrary length bit string is a communications network intrusion signature.

22. A method for detecting whether an arbitrary-length bit string input matches one of a plurality of known arbitrary-length bit strings, using a memory storing, for each of the plurality of known arbitrary-length bit strings, the known arbitrary-length bit string or a pointer thereto, in an addressed location, and a hierarchical data structure, wherein each level of the hierarchical data structure includes one or more nodes, each node associated with an indication of a hash function and a boundary value, the method comprising:
- a) interrogating the hierarchical data structure using hashes of the input arbitrary-length bit string, the indicated hash functions and the boundaries to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists wherein the arbitrary length bit string is a nucleotide sequence.

23. Apparatus for detecting whether an arbitrary-length bit string input matches one of a plurality of known arbitrary-length bit strings, the apparatus comprising:
- a) a memory storing, for each of the plurality of known arbitrary-length bit strings, the known arbitrary-length bit string or a pointer thereto, in an addressed location;
- b) a hierarchical data structure, wherein each level of the hierarchical data structure includes one or more nodes, each node associated with an indication of a hash function and a boundary value, the boundary value partitioning a set of results of the hash function of at least some of the known arbitrary-length bit strings;
- c) means for interrogating the hierarchical data structure using hashes of the input arbitrary-length bit string, the indicated hash functions and the boundaries to determine an address of the memory;
- d) means for reading the known arbitrary-length bit string or a pointer thereto, from the memory at the determined address; and
- e) means for comparing the input arbitrary-length bit string and the known arbitrary-length bit string to determine whether or not a match exists.

* * * * *